United States Patent
Liu et al.

(10) Patent No.: US 8,428,364 B2
(45) Date of Patent: Apr. 23, 2013

(54) EDGE ENHANCEMENT FOR TEMPORAL SCALING WITH METADATA

(75) Inventors: Limin Liu, San Francisco, CA (US); James E. Crenshaw, Burbank, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 13/522,315

(22) PCT Filed: Jan. 7, 2011

(86) PCT No.: PCT/US2011/020544
§ 371 (c)(1),
(2), (4) Date: Jul. 13, 2012

(87) PCT Pub. No.: WO2011/087963
PCT Pub. Date: Jul. 21, 2011

(65) Prior Publication Data
US 2012/0328200 A1     Dec. 27, 2012

Related U.S. Application Data

(60) Provisional application No. 61/295,425, filed on Jan. 15, 2010.

(51) Int. Cl.
*G06K 9/36* (2006.01)
*G06K 9/40* (2006.01)
*H04N 7/12* (2006.01)

(52) U.S. Cl.
USPC ........ 382/199; 382/232; 382/266; 348/415.1; 375/240.21

(58) Field of Classification Search ............ 382/199, 382/232–233, 240, 254, 260, 263–264, 266–269, 382/298–300, 305, 312; 375/240.12, 240.21, 375/240.29, 254; 348/398.1, 415.1; 715/723
See application file for complete search history.

(56) References Cited

U.S. PATENT DOCUMENTS

| | | | |
|---|---|---|---|
| 4,597,010 A | 6/1986 | Carr | |
| 5,852,475 A | 12/1998 | Gupta | |
| 5,852,664 A * | 12/1998 | Iverson et al. | 705/51 |
| 6,005,983 A | 12/1999 | Anderson | |
| 6,195,128 B1 * | 2/2001 | Streater | 375/240.12 |
| 6,269,192 B1 | 7/2001 | Sodagar | |
| 6,285,804 B1 | 9/2001 | Crinon | |

(Continued)

FOREIGN PATENT DOCUMENTS

| | | |
|---|---|---|
| EP | 0709809 | 5/1996 |
| EP | 0783231 | 7/1997 |

(Continued)

OTHER PUBLICATIONS

PCT Search Report of International Application PCT/US2011/020544 filed on Jan. 7, 2011 in the name of Dolby Laboratories Licensing Corporation. Mail date: Apr. 6, 2011.

(Continued)

*Primary Examiner* — Sheela Chawan

(57) ABSTRACT

Methods for post-processing of non-key frames of an image are described. According to the methods, reconstructed non-key frames are updated with information of neighboring key frames. Methods to evaluate whether to update or not update the non-key frames are also described.

30 Claims, 19 Drawing Sheets

U.S. PATENT DOCUMENTS

| | | | |
|---|---|---|---|
| 6,330,367 B2 | 12/2001 | Go | |
| 6,351,491 B1 | 2/2002 | Lee | |
| 6,536,043 B1 | 3/2003 | Guedalia | |
| 6,546,142 B2 | 4/2003 | Katata | |
| 6,639,943 B1 | 10/2003 | Radha | |
| 6,798,422 B2 | 9/2004 | Wang | |
| 6,879,633 B2 * | 4/2005 | Prakash et al. | 375/240.25 |
| 6,917,713 B2 | 7/2005 | Ye | |
| 7,003,173 B2 | 2/2006 | Deshpande | |
| 7,151,858 B2 | 12/2006 | Kyong | |
| 7,207,006 B1 * | 4/2007 | Feig et al. | 715/723 |
| 7,457,474 B1 | 11/2008 | Haskell | |
| 7,519,229 B2 | 4/2009 | Wallace | |
| 7,532,740 B2 | 5/2009 | Levy | |
| 8,055,783 B2 * | 11/2011 | Brannon, Jr. | 709/231 |
| 8,243,820 B2 * | 8/2012 | Holcomb et al. | 375/240.25 |
| 2003/0106063 A1 | 6/2003 | Guedalia | |
| 2003/0215151 A1 | 11/2003 | Bezryadin | |
| 2005/0152611 A1 | 7/2005 | Lee | |
| 2005/0157794 A1 | 7/2005 | Kim | |
| 2005/0169549 A1 | 8/2005 | Cha | |
| 2005/0195900 A1 | 9/2005 | Han | |
| 2005/0232359 A1 | 10/2005 | Cha | |
| 2006/0013300 A1 | 1/2006 | Han | |
| 2006/0013309 A1 | 1/2006 | Ha | |
| 2006/0013310 A1 | 1/2006 | Lee | |
| 2006/0013311 A1 | 1/2006 | Han | |
| 2006/0083302 A1 | 4/2006 | Han | |
| 2006/0083303 A1 | 4/2006 | Han | |
| 2006/0088101 A1 | 4/2006 | Han | |
| 2006/0133485 A1 | 6/2006 | Park | |
| 2006/0165302 A1 | 7/2006 | Han | |
| 2006/0165304 A1 | 7/2006 | Lee | |
| 2006/0215762 A1 | 9/2006 | Han | |
| 2007/0081596 A1 | 4/2007 | Lin | |
| 2007/0091997 A1 | 4/2007 | Fogg et al. | |
| 2007/0140354 A1 | 6/2007 | Sun | |
| 2007/0160301 A1 | 7/2007 | Wang | |
| 2007/0217502 A1 | 9/2007 | Ammar | |
| 2008/0170628 A1 | 7/2008 | Cho | |

FOREIGN PATENT DOCUMENTS

| | | |
|---|---|---|
| JP | 7-288807 | 10/1995 |
| JP | 10-013717 | 1/1998 |
| WO | 0147277 | 6/2001 |
| WO | WO 01/47277 A1 | 6/2001 |
| WO | 0158170 | 8/2001 |
| WO | WO 01/58170 A1 | 8/2001 |
| WO | 2005117447 | 12/2005 |
| WO | 2008/008212 | 1/2008 |
| WO | WO 2008/008212 A1 | 1/2008 |
| WO | WO 2008008212 A1 * | 1/2008 |
| WO | 2009/030597 | 3/2009 |

OTHER PUBLICATIONS

PCT Written Opinion of the ISA for International Application PCT/US2011/020544 filed on Jan. 7, 2011 in the name of Dolby Laboratories Licensing Corporation. Mail date: Apr. 6, 2011.

PCT Written Opinion of the IPEA for International Application PCT/US2011/020544 filed on Jan. 7, 2011 in the name of Dolby Laboratories Licensing Corporation. Mail date: Jan. 31, 2012.

PCT International Preliminary Report on Patentability for International Application PCT/US2011/020544 filed on Jan. 7, 2011 in the name of Dolby Laboratories Licensing Corporation. Mail date: Apr. 24, 2012.

Xiong et al. 2007. Generalized in-scale motion compensation framework for spatial scalable video coding. *Visual Communications and Image Processing*. Jan. 30-Feb. 1, 2007.

Xu, J-Z. et al. 2006. Improvement of spatial scalability. A New Method for Inter-Layer Prediction in Spatial Scalable Video Coding. ITU study group 16—Video coding experts group—iso/iec MPEG & itu-t SG16 Q6), No. JVT-T081.

Schwarz, H. et al., "Overview of the Scalable Video Coding Extension of the H.264/AVC Standard" IEEE Transactions on Circuits and Systems for Video Technology, vol. 17, No. 9, pp. 1103-1120, Sep. 2007.

Radha, H. et al., "The MPEG-4 Fine-Grained Scalable Video Coding Method for Multimedia Streaming Over IP", IEEE Transactions on Multimedia, vol. 3, No. 1, pp. 53-68, Mar. 2001.

Dane, G. et al., "Encoder-Assisted Adaptive Video Frame Interpolation" Proceedings of the IEEE International Conference on Acoustics, Speech, and Signal Processing, vol. 2, pp. 349-352, Philadelphia, PA, Mar. 2005.

Cote, G. et al., "H.263+: Video Coding at Low Bit Rates" IEEE Transactions on Circuits and Systems for Video Technology, vol. 8, No. 7, pp. 849-866, Nov. 1998.

Comer, Mary L, "Reduction of Block Artifacts in Reduced Resolution Update Video Coding" IEEE Transactions on Circuits and Systems for Video Technology, vol. 16, No. 3, pp. 386-395, Mar. 2006.

Li X. et al., "New Edge-Directed Interpolation" IEEE Transactions on Image Processing, vol. 10, No. 10, pp. 1521-1527, Oct. 2001.

Freeman, W.T. et al., "Example-Based Super-Resolution" IEEE Computer Graphics and Applications, vol. 22, No. 2, pp. 56-65, Mar. 2002.

Paek, H. et al., "A DCT-Based Spatially Adaptive Post-Processing Technique to Reduce the Blocking Artifacts in Transform Coded Images" IEEE Transactions on Circuits and Systems for Video Technology, vol. 10, No. 1, Feb. 2000, pp. 36-41.

Zhang, Y. et al., "Error Concealment for Video Transmission With Dual Multiscale Markov Random Field Modeling" IEEE Transactions on Image Processing, vol. 12, No. 2, Feb. 2003, pp. 236-242.

Jiang, B. et al., "Noise Reduction Using Multi-Resolution Edge Detection" Proceedings of the SPIE—The International Society for Optical Engineering, vol. 7245, pp. 724507, published in 2009.

Won, Chee Sun, "Using Edge Histogram Descriptor of MPEG-7 for the Measurement of Image Quality and Modifications" Proc. SPIE—The International Society for Optical Engineering, published in 2006.

Lee, H.K. et al., "Video Contents Summary Using the Combination of Multiple MPEG-7 Metadata" Proc. SPIE—The International Society for Optical Engineering, vol. 4664, pp. 1-12, published in 2002.

Song, B.C. et al., "Fast Edge Map Extraction from MPEG Compressed Video Data for Video Parsing" Proc. SPIE 3656, published in 1998.

Xiong Institute of Computing Technology (China) R et al., "Generalized in-Scale Motion Compensation Framework for Spatial Scalable Video Coding" Visual Communications and Image Processing, Jan. 2007.

Xiong, R. et al., "A New Method for Inter-Layer Prediction in Spatial Scalable Video Coding" ITU Study Group 16—Video Coding Experts Group—ISO/IEC MPEG and ITU-T, 20th meeting: Klagenfurt, Austria, Jul. 2006.

* cited by examiner

| SEQUENCE | $\tilde{f}$ | UNI-DIRECTIONAL TEMPORAL EDGE COMPENSATION $f' = g + (\tilde{f} - \tilde{g})$ | BI-DIRECTIONAL TEMPORAL EDGE COMPENSATION $\tilde{f} + \dfrac{(g - \tilde{g} + h - \tilde{h})}{2}$ |
|---|---|---|---|
| FOREMAN_352X288_30P | 25.2766 | 29.5214 | 32.02 |
| MOBILE_352X288_30P | 18.1518 | 21.0292 | 25.2289 |
| TEMPETE_352X288_30P | 21.8975 | 27.8413 | 31.681 |
| BIGSHIPS_1280X720_60P | 27.9452 | 35.1375 | 37.7584 |
| NIGHT_1280X720_60P | 25.0219 | 30.6797 | 32.5175 |
| PANSLOW_1280X720_60P | 24.1494 | 29.4916 | 32.6887 |

FIGURE 18

EDGE ENHANCEMENT FOR TEMPORAL SCALING WITH METADATA

CROSS-REFERENCE TO RELATED APPLICATIONS

This application is the U.S. national stage of International Application PCT/US2011/020544 filed 7 Jan. 2011, which in turn claims priority to U.S. Provisional Patent Application No. 61/295,425, filed 15 Jan. 2010, which is hereby incorporated by reference in its entirety.

FIELD

The present disclosure relates to scalability of video streams. In particular, it relates to edge enhancement for temporal scaling with metadata.

BACKGROUND

Video playback capabilities vary widely among device classes. At one end of the spectrum are TV displays that render 120 high definition frames per second. On the low end are mobile phones that may only be capable of showing 15 low resolution frames per second. In addition to the limitations of the rendering device, the bandwidth of the network used to disseminate the content may also dictate a ceiling for frame rate and image resolution. For example, the very best residential U.S. broadband connections, such as Verizon's FIOS, can easily carry compressed streams for high quality, 60 frames per second high definition video. Many mobile operators still have 2.5G or slower data networks that permit just 15 frames per second (fps) with only 176×144 pixels (QCIF) per frame.

Rather than having a separate compressed stream for every situation, it is often preferred to include some extra information in the same stream so that each display system can decode the proper level of quality for its capabilities. By way of example, a mobile handset might be able to find 20 fps QCIF while a PC reading the same stream might decode some extra information and then be able to produce 30 fps of 720×480 progressive (480p) data.

Bitstreams which have these extra layers are said to be scalable and the general concept is referred to as scalability. It is desirable to keep the overhead for the extra layers to a minimum. Ideally there should be no more bits than the maximum quality content requires and in fact, as shall be shown later, it is possible to have the size of the scalable bitstream very close to what the lower quality requires without much reduction to the fidelity of the highest quality content.

In current practice, it is fortunate that the so-called H.264 encoding technology can be used in a variety of situations. However, the standard does not in itself support scalability in a sufficiently broad manner. Thus, one of the challenges for scalable systems is to make sure that standard H.264 decoders will be able to play the stream at some level of quality, even if the higher quality levels are only available to enhanced decoders. This requirement of standards compliance can also be applied to any other particular standard, including legacy encoders like MPEG-2 and future encoders not yet specified.

In addition to the bandwidth constraint and display constraint, processing power is also a significant factor. Mobile devices like cellular phones are inherently limited in their computing ability by battery, size and cost. Also, most television systems (including set top boxes) are designed as embedded systems with a lot of dedicated hardware and only a minimal amount of programmable processing capability. Therefore any scalable bitstream must either be supported in hardware, which takes several years of lead time, or must require a low amount of computing.

Taking the constraints of bandwidth, processing power, display capability and standards compliance into account is a challenging problem which has not been satisfactorily addressed in the prior art.

SUMMARY

According to a first aspect, a method to post-process a non-key frame of an image through a neighboring key frame of the image is provided, comprising: downsampling a reconstructed key frame to form a downsampled reconstructed key frame; upsampling the downsampled reconstructed key frame to form an upsampled reconstructed key frame; forming a difference between the reconstructed key frame and the upsampled reconstructed key frame; and adding the difference to a reconstructed non-key frame to compensate the reconstructed non-key frame.

According to a second aspect, a method to process a non-key frame of an image through a key frame of the image is provided, comprising: downsampling a reconstructed key frame to form a downsampled reconstructed key frame; forming a difference between the downsampled non-key frame and a downsampled reconstructed key frame; upsampling the difference to form an upsampled difference; and adding the upsampled difference to the reconstructed key frame.

According to a third aspect, a method to process a non-key frame of an image through a neighboring key frame of the image is provided, comprising: forming a difference between the non-key frame and the key frame; downsampling the difference to form a downsampled difference; upsampling the downsampled difference to form an upsampled difference; reconstructing the key frame; and adding the upsampled difference to the reconstructed key frame.

According to a fourth aspect, a method to post-process a non-key frame of an image through key frames of the image is provided, comprising: downsampling a plurality of reconstructed key frames to form downsampled reconstructed key frames; upsampling the downsampled reconstructed key frames to form upsampled reconstructed key frames; forming differences between the reconstructed key frames and the respective upsampled reconstructed key frames; and adding a sum of the differences to a reconstructed non-key frame to compensate the reconstructed non-key frame.

According to a fifth aspect, a method to post-process a non-key frame of an image through key frames of the image is provided, comprising: downsampling reconstructed key frames to form downsampled reconstructed key frames; for each downsampled reconstructed key frame forming a difference between a downsampled non-key frame and the downsampled reconstructed key frame; upsampling each difference to form upsampled differences; adding each reconstructed key frame to a respective upsampled difference to form revised upsampled differences; and adding the revised upsampled differences together to form a compensated non-key frame.

According to a sixth aspect, a method to post-process a non-key frame of an image through key frames of the image is provided, comprising: providing reconstructed key frames; upsampling downsampled differences between each reconstructed key frame and a non-key frame to form upsampled differences; adding each upsampled difference to a respective reconstructed key frame to form revised upsampled differences; and adding the revised upsampled differences together to form a compensated non-key frame.

According to a seventh aspect, a method to evaluate whether to update or not update a non-key frame portion of an image during decoding of the image is provided, comprising: providing a first non-key frame portion; providing a difference key frame portion between a key frame portion and an upsampled version of the key frame portion; adding the difference key frame portion to the first non-key frame portion to form a second non-key frame portion; downsampling the second non-key frame portion; evaluating if a difference portion between the downsampled second non-key frame portion and a downsampled first non-key frame portion is less than a threshold value; if the difference portion is less than the threshold value updating the non-key frame portion to the second non-key frame portion; and if the difference portion is not less than the threshold value, keeping the first non-key frame portion.

According to an eighth aspect, a method to update a non-key frame portion of an image during decoding of the image is provided, comprising: providing a first non-key frame portion; providing a difference key frame portion between a key frame portion and an upsampled version of the key frame portion; adding the difference key frame portion to the first non-key frame portion to form a second non-key frame portion; downsampling the second non-key frame portion; forming a difference between a downsampled first non-key frame portion and the downsampled second non-key frame portion; upsampling the difference; and adding the upsampled difference to the second non-key frame portion to form an updated non-key frame portion.

According to a ninth aspect, a method to evaluate whether to apply temporal edge compensation to a non-key frame portion of an image during a decoding process of the image is provided, comprising: providing a key frame portion of the image; downsampling the key frame portion to form a downsampled key frame portion; upsampling the downsampled key frame portion to form an upsampled key frame portion; evaluating whether a difference between the upsampled key frame portion and an uncompensated non-key frame portion is less than a threshold; if the difference is less than the threshold, compensating the non-key frame portion by adding to the non-key frame portion a difference between the key frame portion and the upsampled key frame portion; and if the difference is not less than the threshold, keeping the non-key frame portion uncompensated.

According to a tenth aspect, a method to evaluate whether to apply temporal edge compensation to a non-key frame of an image during a decoding process of the image, comprising: providing first and a second key frame portions of the image; downsampling the first and the second key frame portions of the image to form downsampled first and second key frame portions; upsampling the downsampled first and second key frame portions to form upsampled first and second key frame portions; evaluating whether a first difference between the upsampled first key frame portion and an uncompensated non-key frame portion is less than a threshold; evaluating whether a second difference between the upsampled second key frame portion and the uncompensated non-key frame portion is less than the threshold; if the first difference and the second difference are less than the threshold, compensating the non-key frame portion by adding to the non-key frame portion a sum of a difference between the first key frame portion and the upsampled first key frame portion and a difference between the second key frame portion and the upsampled second key frame portion; if the first difference is less than the threshold and the second difference is not less than the threshold, compensating the non-key frame portion by adding to the non-key frame portion the difference between the first key frame portion and the upsampled first key frame portion; if the first difference is not less than the threshold and second difference is less than the threshold, compensating the non-key frame portion by adding to the non-key frame portion the difference between the second key frame portion and the upsampled second key frame portion; and if the first difference and the second difference are not less than the threshold, keeping the non-key frame portion uncompensated.

According to an eleventh aspect, a method to evaluate whether to update or not update non-key frame portions of an image during decoding of the image is provided, comprising: providing a first non-key frame portion; providing a plurality of difference key frame portions between each key frame portion and up sampled versions of the key frame portions; adding each difference key frame portion to a respective non-key frame portion to form a plurality of second non-key frame portions; downsampling each second non-key frame portion; evaluating if one or more difference portions between each downsampled second non-key frame portion and a downsampled first non-key frame portion are less than a threshold value; if one or more difference portions are less than the threshold value updating the non-key frame portion, otherwise keeping the first non-key frame portion.

According to a twelfth aspect, a method to update a non-key frame portion of an image during decoding of the image is provided, comprising: providing a first non-key frame portion; providing a plurality of difference key frame portions between key frame portions and respective upsampled versions of the key frame portions; adding the difference key frame portions to the first non-key frame portion to form a second non-key frame portion; downsampling the second non-key frame portion; forming a difference between a downsampled first non-key frame portion and the downsampled second non-key frame portion; upsampling the difference; and adding the upsampled difference to the second non-key frame portion to form an updated non-key frame portion.

According to a thirteenth aspect, a method to enhance a reconstructed frame of an image through a neighboring frame of the image is provided, comprising: downsampling a reconstructed neighboring frame of the frame to be enhanced to form a downsampled reconstructed frame; upsampling the downsampled reconstructed frame to form an upsampled reconstructed frame; forming a difference between the reconstructed frame and the upsampled reconstructed frame; and adding the difference to the reconstructed frame to be enhanced.

According to a fourteenth aspect, a method to enhance a frame of an image through a neighboring frame of the image is provided, comprising: downsampling a reconstructed neighboring frame of the frame to be enhanced to form a downsampled reconstructed frame; forming a difference between a downsampled frame to be enhanced and the downsampled reconstructed key frame; upsampling the difference to form an upsampled difference; and adding the upsampled difference to the reconstructed neighboring frame.

According to a fifteenth aspect, a method to enhance a frame of an image through a neighboring frame of the image is provided, comprising: forming a difference between the frame to be enhanced and the neighboring frame; downsampling the difference to form a downsampled difference; upsampling the downsampled difference to form an upsampled difference; reconstructing the neighboring frame; and adding the upsampled difference to the reconstructed neighboring frame.

According to a sixteenth aspect, a method to enhance a frame of an image through neighboring frames of the image is provided, comprising: downsampling a plurality of reconstructed neighboring frames to form downsampled reconstructed neighboring frames; upsampling the downsampled reconstructed neighboring frames to form upsampled reconstructed neighboring frames; forming differences between the reconstructed neighboring frames and the respective upsampled reconstructed neighboring frames; and adding a sum of the differences to a reconstructed frame to enhance the reconstructed frame.

According to a seventeenth aspect, a method to enhance a frame of an image through neighboring frames of the image is provided, comprising: downsampling reconstructed neighboring frames to form downsampled reconstructed neighboring frames; for each downsampled reconstructed neighboring frame forming a difference between a downsampled frame to be enhanced and the downsampled reconstructed neighboring frame; upsampling each difference to form upsampled differences; adding each reconstructed neighboring frame to a respective upsampled difference to form revised upsampled differences; and adding the revised upsampled differences together to form an enhanced frame.

According to an eighteenth aspect, a method to enhance a frame of an image through neighboring frames of the image is provided, comprising: providing reconstructed neighboring frames; up sampling downsampled differences between each reconstructed neighboring frame and a frame to be enhanced to form upsampled differences; adding each upsampled difference to a respective reconstructed neighboring frame to form revised upsampled differences; and adding the revised upsampled differences together to form an enhanced frame.

According to a further aspect, a system for processing one or more frames of an image according to any one of the methods of the present application is disclosed.

According to another aspect, use of any one of the methods of the present application to process one or more frames of an image is disclosed.

According to yet another aspect, a computer-readable medium containing a set of instructions that causes a computer to perform any one of the methods of the present application is disclosed.

BRIEF DESCRIPTION OF THE DRAWINGS

FIG. 18 is a table showing results with and without temporal edge enhancement post-processing techniques, where the downsample ratio is 4×4.

DESCRIPTION OF EXAMPLE EMBODIMENTS

The present disclosure addresses temporal scalability. Temporal scalability is defined as a feature that allows selection (e.g., by a decoder) of the appropriate frame rate for a given situation.

Many standards have a mechanism providing for fields where the content of the stream is described. Most decoders just skip over such fields. Typical uses include the location in which the video was taken, names of people shown in the video or names of people involved in making the video. Because of the high level nature of this information, it is often referred to as metadata.

Since the syntax for adding metadata allows for any kind of data, the additional information described in the present disclosure may be embedded in the video stream as metadata. Because of this, the term metadata as used in the present disclosure refers to any additional description of the video, not just high level data about the content of the video.

Embodiments of the present disclosure relate to the area of temporal scalability of a video stream. In other words, an encoder adds a small amount of information to a compressed stream so that a receiving decoder can choose to play the video at the full frame rate or a reduced rate, depending on conditions. As shown in the following description, the metadata can help to achieve temporal scalability. The post-processing methods according to embodiments of the present disclosure can further improve the visual quality by adding temporal edge information.

Figure 1:
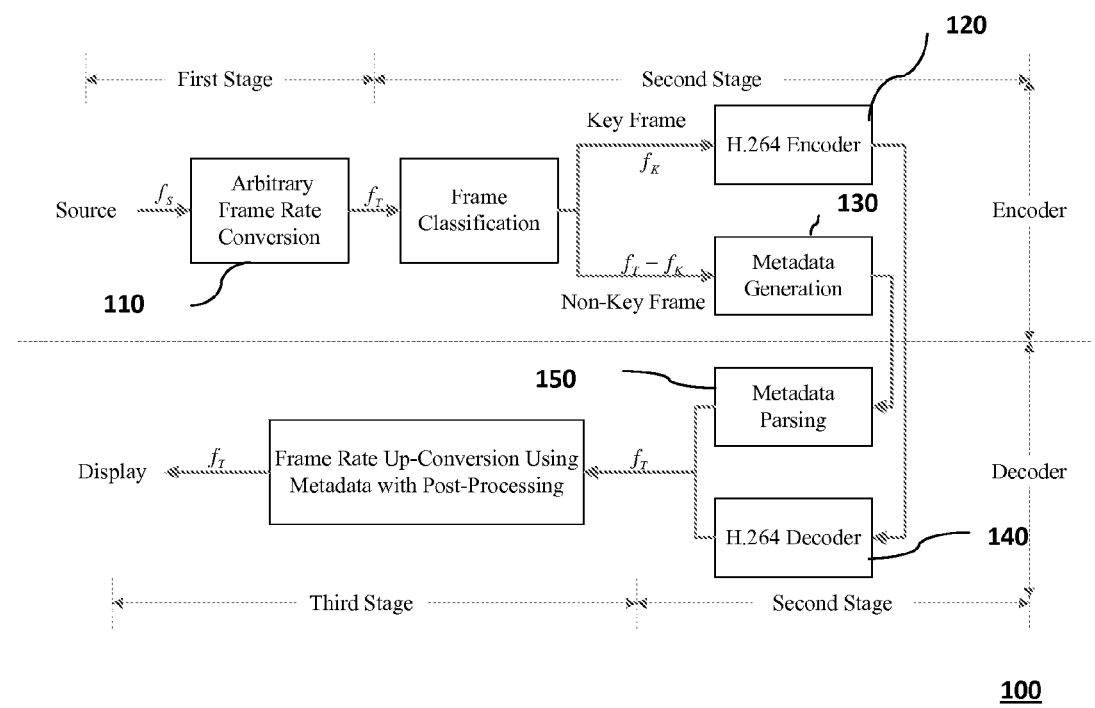
FIG. 1 shows a schematic view of a system that uses metadata to achieve temporal scalability.
Figure 2:
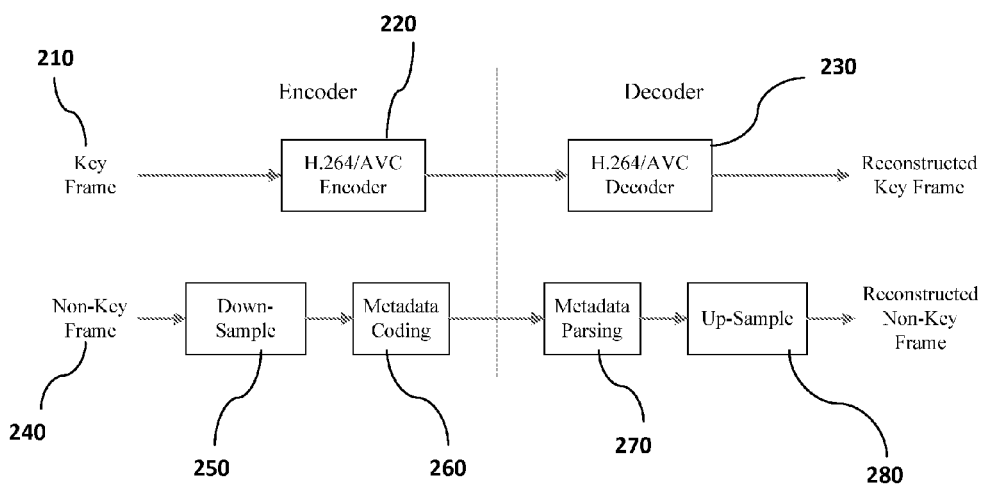
FIG. 2 shows a schematic diagram where metadata are used to add temporal scalability.
Figure 3:
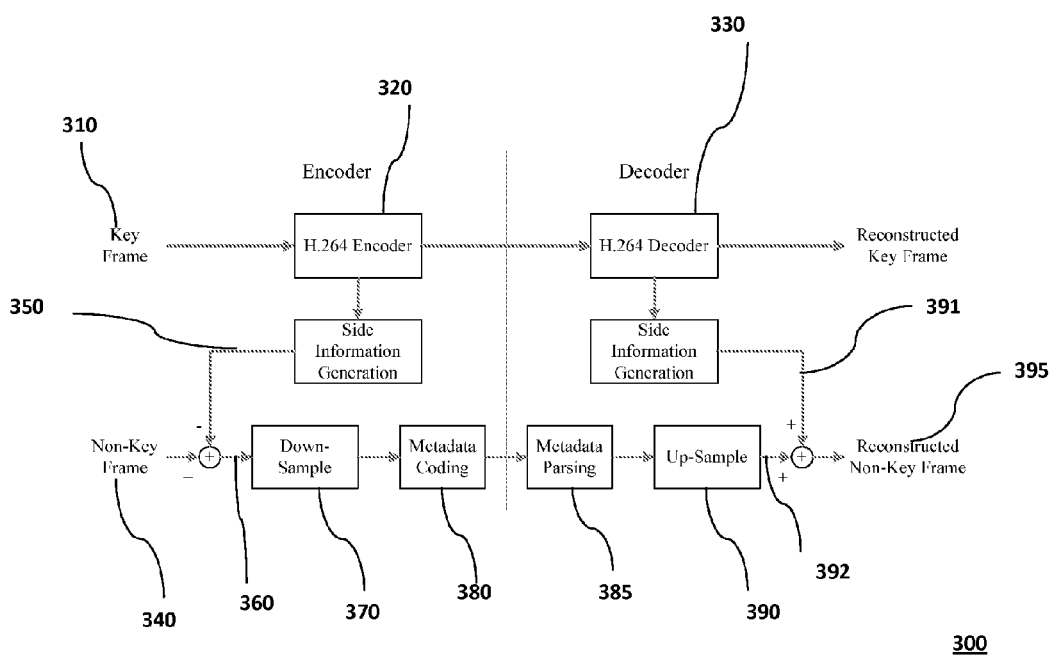
FIG. 3 shows a schematic diagram similar to FIG. 2 where information about the key frames is used for the metadata coding of non-key frames.

FIG. 1 shows a conversion system (100) that uses metadata and post processing to introduce and use temporal scalability. The conversion system (100) can comprise one or more of the following stages. In a first stage, the frames at the original source frame rate $f_S$ are converted to a target frame rate $f_T$. Reference is made to the arbitrary frame rate conversion block (110). Any existing frame rate conversion methods can be applied in this stage. In a second stage, the sequence at rate $f_T$ is divided into two types of frame sequences: sequence of key frames and sequence of non-key frames. Key frames are the frames in the main bitstream, to be later played in the decoder at a reduced rate. Non-key frames contain additional information, as later explained in detail, and can be played together with the reconstructed key frames at the decoder to achieve a full frame rate. The key frames are encoded (120) using traditional video encoding methods such as H.264/AVC. The non-key frames are represented by metadata (130). FIGS. 2 and 3, later explained in detail, will show examples of the metadata generation block (130). In the embodiment of FIG. 2 the metadata is the downsampled version of the non-key frames. In the embodiment of FIG. 3 the metadata is the downsampled version of the difference between the non-key frames and the side information from the key frames. Therefore, the metadata describes certain information about the frame and can be encoded at a lower bit rate than encoding the full frame. Metadata can be anything in addition to the key frames and help to reconstruct the full rate sequences. A typical metadata contains information on non-key frames. At the decoder, the key frames are decoded (140) using a corresponding video decoder. The metadata for the non-key frames is extracted (150) to help reconstruct the non-key frames. FIGS. 2 and 3, later explained in detail, will show examples of the metadata parsing block (140). Although in some embodiments of the present disclosure reconstruction can occur through metadata, embodiments are also possible where the reconstructed non-key frames are created with very little or no metadata at all.

In one embodiment, the key frames can be classified so that all of the original source frames are classified as key frames and $f_K = f_S$, where $f_K$ is the frame rate of the key frames. In that case, the metadata generation block (130) will receive data at $f_T - f_S$ frames per second according to the frames created by the frame rate conversion. Other values of $f_K$ are possible and, in particular, metadata may be generated for frames that were in the original source. In other words, it is not required that all source frames are classified as key frames.

The following paragraphs will first describe two embodiments of metadata generation and parsing (see blocks (130) and (150) of FIG. 1) with reference to FIGS. 2 and 3. Afterwards, an edge enhancement post-processing method will be discussed (see FIG. 4), which provides the third stage post processing using temporal edge enhancement to improve the visual quality of the non-key frames.

FIG. 2 shows a first embodiment (200) of metadata generation and parsing. The key frames (210) are encoded (220) using video coding methods such as H.264/AVC and decoded (230) using the corresponding video decoder as already discussed with reference to FIG. 1. The non-key frames (240) are represented as metadata and will be referred to in the following lines as type-I assisted frames. The original full-resolution non-key frame can be denoted as f. An assisted frame is a downsampled frame denoted as $\hat{f} = D(f)$. $D(\bullet)$ denotes the downsampling operator. The downsampling filters (250) can be bilinear, bicubic, nearest neighbor and Lanczos-kernel re-sampling filters. For example, nearest neighbor filtering assigns the pixel value of the nearest neighbor to the current position. One example of bilinear filtering derives a weighted sum of the four nearest neighbors (A, B, C and D, e.g., up, down, left and right neighbors) and uses it as the pixel value for the current position X, $$p_x = w_A p_A + w_B p_B + w_C p_C + w_D p_D. \quad (1)$$

Here $p_i$ denotes the pixel value at position i (i=X, A, B, C, D) and $w_i$ denotes the corresponding weight for position i.

The downsampled frame can be sent to the decoder directly, or it can be encoded (260) using video compression methods. Since the resolution of the downsampled frame is much smaller than the original full resolution frame, it requires much lower bit rate and decoding complexity. At the decoder, the decoded (270) downsampled frame $\hat{f}$ is upsampled (280) to reconstruct $\tilde{f} = U(\hat{f})$. $U(\bullet)$ denotes the upsampling operator. The upsampling filters (280) can be the corresponding filters of the downsampling filters used at the encoder stage. For example, if the downsampling filter is bilinear, the upsampling filter is bilinear, too. If the downsampling filter is bicubic, the upsampling filter can be bicubic, too.

FIG. 3 shows a second embodiment (300) of metadata generation and parsing. The key frames (310) are encoded (320) using video coding methods such as H.264/AVC and decoded (330) using a corresponding video decoder. The non-key frames (340) are represented as metadata, referred to as type-II assisted frames. At the encoder, an interpolated frame (350) is generated from the key frames as side information. Then the difference frame (360) between the original frame and the side information frame is downsampled (370) and represented as metadata. The metadata can be directly sent to the decoder or compressed (380) by some image/video coding methods. At the decoder, the metadata is parsed (385) and the downsampled difference frame is upsampled (390) to the original size. Since the key frames are available at both the encoder and the decoder, the side information frame (391) is generated using the same algorithm as in the encoder. Finally the side information frame (391) and the upsampled difference frame (392) are added to reconstruct the non-key frame (395).

Figure 4:
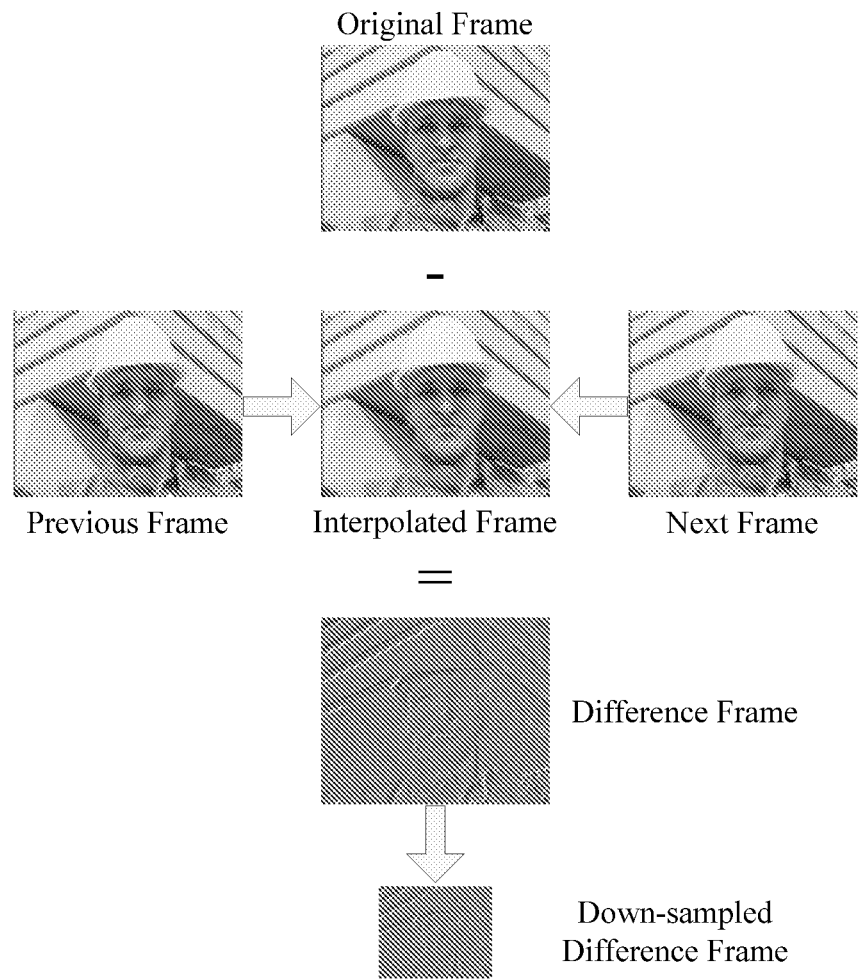
FIG. 4 shows an example of metadata in accordance with FIG. 3 used to describe a non-key frame when side information from key frames is used to predict the interpolated frame.

An example of side information generation (400) as produced by the arrangement of FIG. 3 is shown in FIG. 4, where linear interpolation is applied to the neighboring previous (410) and next (420) key frames to generate the interpolated frame (430). Then the difference frame (440) between the original non-key frame (450) and the interpolated frame (430) is derived, which is downsampled (460) to generate the metadata.

Another embodiment of side information can be generated using motion compensated temporal interpolation methods, which can be formulated as $$p_I(x,y) = p_R(x - \Delta x, y - \Delta y). \quad (2)$$

$p_I(x, y)$ denotes the pixel value of the interpolated frame at position (x, y) and $p_R(x, y)$ denotes the pixel value of the reference frame. In this case, the previously reconstructed key frames can serve as the reference frames. Every pixel or every block in the interpolated frame is associated with a motion vector $(\Delta x, \Delta y)$. The motion vector describes the motion trajectory of the object between the interpolated frame and the reference frame. The interpolated frame can be reconstructed from the reference frame by the shift of the motion vector as in equation (2). The motion vectors can be derived by motion estimation of the reconstructed frames. The motion vectors can also be derived from the motion vectors in the bitstream of the source frames. Multiple key frames can be used in the generation of the side information. In addition, the side information can be extracted not only from the key frames but also from the non-key frames.

The frame rate conversion methods with metadata discussed in the previous FIGS. 1-4 send downsampled content as the metadata. The upsampling process at the decoder may lead to blurring and other artifacts. In the following paragraphs, post-processing methods using temporal edge compensation to enhance the edge information for frame rate conversion with metadata will be discussed. Embodiments of this method use the edge information from the received key frames to improve the quality of the non-key frames.

It should be noted that previous compression techniques, including the ones shown in FIGS. 1-4, assume that because the non-key frame description is in a reduced resolution, the side information from the neighboring frames should also be used at a low resolution. While this is true for prediction, Applicants have noted the benefit of subsequently applying the high-frequency information to the full resolution neighboring frames. This use is counterintuitive due to the potential for motion between frames that makes it hard to decide where the high-frequencies belong.

According to several embodiments, the temporal edge compensation methods of the present disclosure use the edges of the neighboring key frames to compensate the lost edge information at the non-key frame. The high frequency contents of the non-key frames are lost during the downsampling and subsequent upsampling process. Similar downsampling and upsampling at the neighboring key frames is performed at the decoder. The high frequency contents of the key frames are used to compensate the reconstructed non-key frames.

Figure 5:
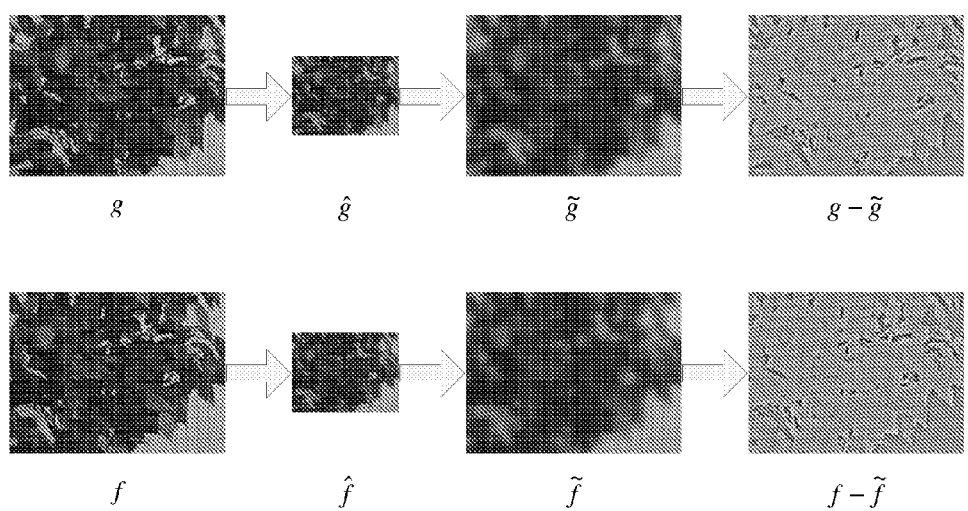
FIG. 5 shows examples of lost edge information due to downsampling and upsampling.

As shown in the exemplary depiction (500) of FIG. 5, the full-resolution non-key frame is denoted as f and a downsampled frame is denoted as f̂. The upsampled reconstruction is denoted as f̃. Similarly, the decoded full resolution, downsampled and upsampled versions of the neighboring key frame are denoted as g, ĝ and g̃ respectively. Typically, the neighboring key frames are the key frames next to the current frame in the time index. The time index is the frame number index according to the shooting time of the frames. As shown in FIG. 5, the sharp edges are lost during the downsampling and upsampling process for both key and non-key frames. The difference images g−g̃ and f−f̃ (amplified for easy visualization) are referred to as the lost edge maps. The maps show the lost high frequency contents during the downsampling and upsampling process. As seen in FIG. 5, for neighboring frames, the difference images are similar to each other, even for sequences with relatively complex motions. This shows that the lost high frequency content at the neighboring key frames is highly correlated to that in the upsampled non-key frames.

Based on this observation, the temporal edge compensation method according to an embodiment of the present disclosure applies the lost edge map from g to compensate for the edge information in f̃ at the decoder, $$f'=\tilde{f}+(g-\tilde{g}) \qquad (3)$$

Figure 6:
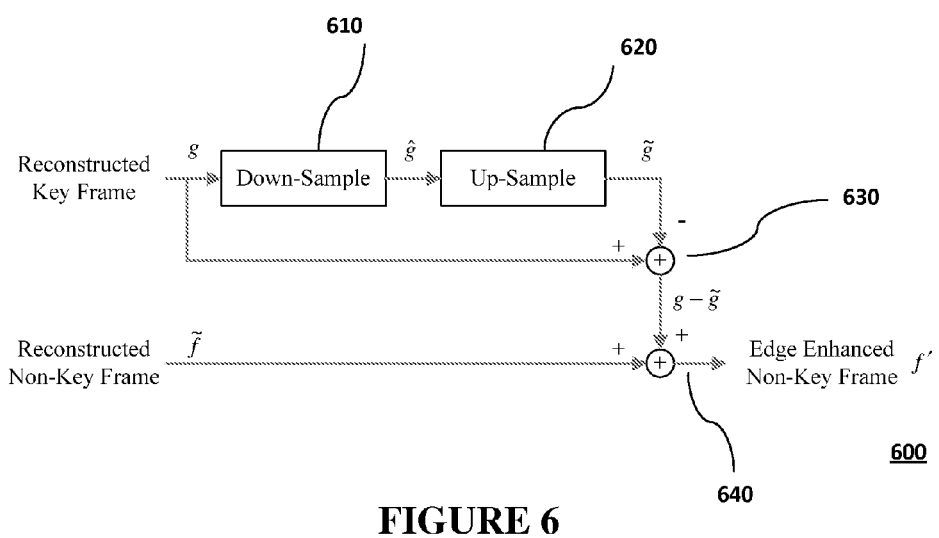
FIG. 6 shows a block diagram with the computation of an edge enhanced non-key frame.

As shown in the arrangement (600) of FIG. 6, the reconstructed key frame g can be downsampled (610) to generate the downsampled frame ĝ using the same filter (610) that generates f̂ from f. In other words, according to an embodiment of the present disclosure, filter (610) of FIG. 6 at the decoder can be identical to block (250) of FIG. 2 or block (370) of FIG. 3 at the encoder. The downsampled frame ĝ can be upsampled (620) to the original size as g̃ using the same filter that generates f̃ from f̂. In other words, according to an embodiment of the present disclosure, filter (620) of FIG. 6 at the decoder can be identical to block (280) of FIG. 2 or block (390) of FIG. 3 at the encoder. A first adder (630) generates the edge map g−g̃. The second adder (640) compensates f̃ using the edge map g−g̃ and generates the edge enhanced non-key frame f'. As also mentioned above, key frame g is the neighboring key frame of non-key frame f. For example, if the N-th frame of a sequence is a non-key frame, and the (N−1)-th frame of the sequence is a key frame, then the (N−1)-th frame is the neighboring key frame of the N-th non-key frame.

Figure 7:
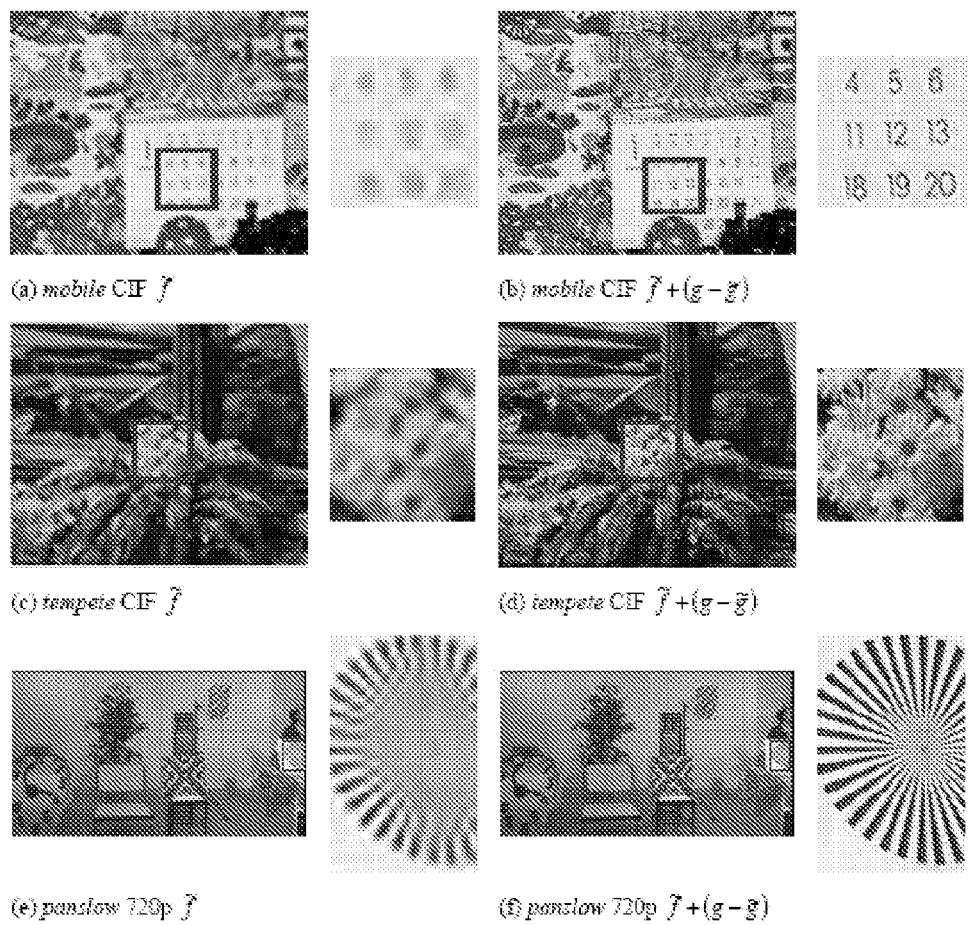
FIG. 7 shows examples of image improvements in accordance with embodiments of the present disclosure. The downsampling ratio used in FIG. 7 is 4×4.

FIG. 7 shows three examples of the temporal edge enhancement embodiment discussed in FIGS. 5 and 6 above. The mobile CIF (insets a and b), tempete CIF (insets c and d) and panslow 720p (insets e and f) sequences are downsampled by a ratio 4×4 and upsampled to the original size. In the mobile CIF sequence, the upsampled image without post-processing f̃ (see inset a) is blurred and the numbers on the calendar are illegible as shown in a highlighted part (710). After the temporal edge enhancement post-processing, the reconstruction f̃+(g−g̃) (see inset b) shows a much clearer view (720) of the numbers. In the tempete CIF sequence, the texture of the flowers are perfectly reconstructed with f̃+(g−g̃) (see inset d and view (730)) compared to the blurred version f̃ (see inset c and view (740)). Similarly, the straight lines of the dashboard in the panslow 720p sequence were distorted by downsampling (inset e and view (750)) and corrected with edge enhancement (inset f and view (760)).

Figure 8:
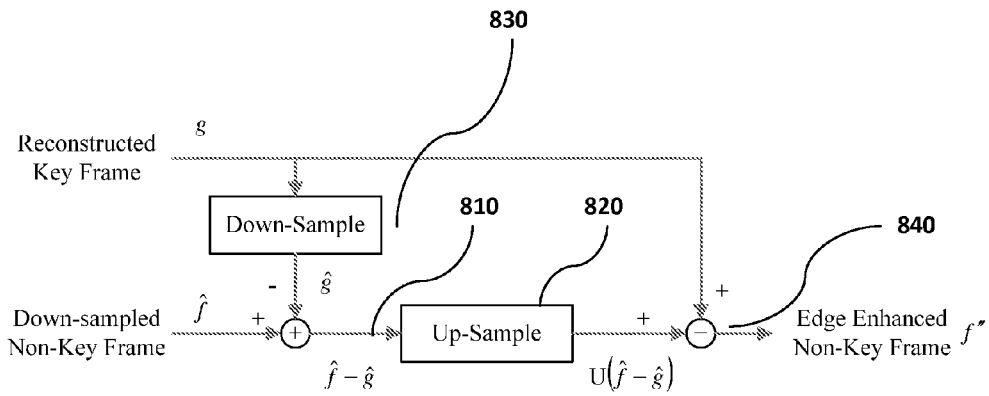
FIGS. 8 and 9 show computational alternatives to the embodiment of FIG. 6.
Figure 9:
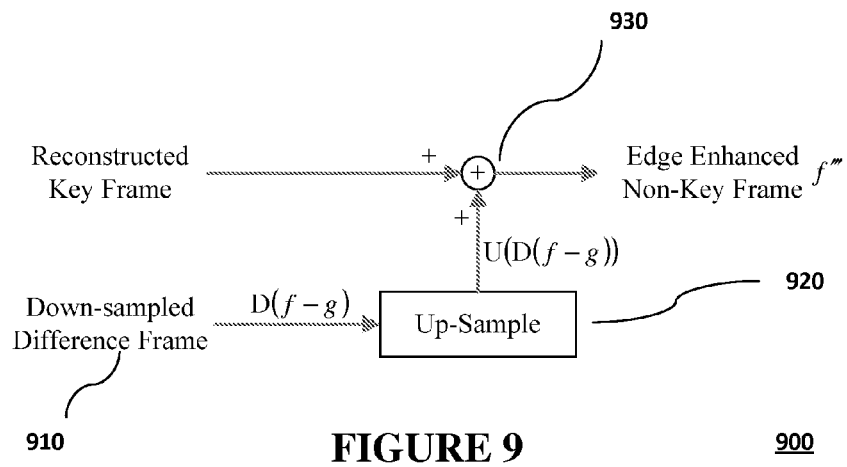

FIGS. 8 and 9 shows additional embodiments of the present disclosure based on the teachings of FIG. 6.

In particular, the post processing f'=f̃+(g−g̃) of equation (3) can be re-formulated as $$f'=g+(\tilde{f}-\tilde{g}). \qquad (4)$$

In equation (4) the difference between the upsampled key frame g̃ and non-key frame f̃ is applied for the post processing. Alternatively, as also shown in FIG. 8, a difference image (810) between the downsampled key frame ĝ and the downsampled non-key frame f̂ is generated. In the next step, the difference image f̂−ĝ is upsampled (820) and added to the reconstructed key frame:

$$f''=g+U(\hat{f}-\hat{g}). \qquad (5)$$

As shown in the post-processing blocks of FIG. 8 at the decoder, the metadata is also f̂ as in the approach previously specified by equation (3). In this case, the reconstructed key frame g is downsampled (830) to ĝ at the decoder. Then the difference f̂−ĝ is upsampled (820) to the original size as f and denoted as U(f̂−ĝ). It is then added (840) to the reconstructed key frame g to form an edge enhanced reconstructed non-key frame f''.

On the other hand, in accordance with the embodiment of FIG. 9, the downsampled difference image between the original non-key frame and key frame D(f−g) (910) can be sent, upsampled (920) at the decoder and added to the reconstructed key frame:

$$f'''=g+U(D(f-g)). \qquad (6)$$

As shown in FIG. 9, the metadata D(f−g) (910) is a downsampled version of the difference frame between the key frame g and the non-key frame f. Then D(f−g) is upsampled (920) to the original size as f and denoted as U(D(f−g)). The upsampled difference is then added (930) to the reconstructed key frame g to reconstruct the edge enhanced non-key frame f'''. Generally, downsampling of the difference f−g occurs at the encoder, to reduce the size of the metadata. However, such downsampling can also occur at the decoder if the data rate of the metadata is not relevant.

The embodiments of FIGS. 6-9 only use edge information from one neighboring key frame g for temporal edge compensation. Embodiments where bidirectional temporal edge compensations, based on two neighboring key frames, for example previous and following key frames, are provided, will now be discussed. In the following paragraphs embodiments with one previous key frame and one following key frame will be discussed. However, the person skilled in the art will understand that also other embodiments are possible, such as two previous key frames or two following key frames.

The following (or second neighboring) key frame will be denoted as h. A similar downsampling and upsampling process can be applied to generate a downsampled version ĥ=D(h) and an upsampled version h̃=U(ĥ). A bidirectional temporal edge compensation can be defined as $$\tilde{f} + \frac{(g - \tilde{g} + h - \tilde{h})}{2}. \quad (7a)$$

Figure 10A:
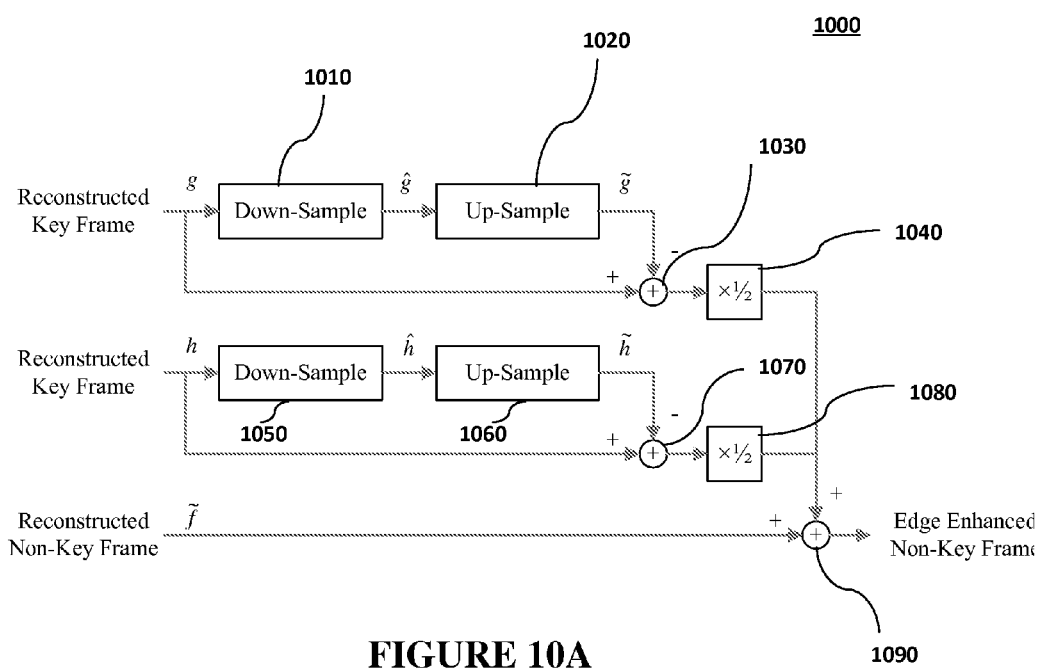
FIGS. 10A, 10B and 10C show block diagrams with bi-directional temporal edge compensation.

A schematic diagram showing bidirectional temporal edge compensation according to a further embodiment of the disclosure is shown in FIG. 10A. The previous (or first neighboring) key frame g is downsampled (1010) to ĝ. The downsampled frame ĝ is upsampled (1020) to the original size as g and denoted as g̃. A first adder (1030) generates the edge map g−g̃. The edge map is then multiplied by $$\frac{1}{2}$$

(1040) to generate $$\frac{1}{2}(g - \tilde{g}).$$

The same process (1050, 1060, 1070, 1080) is applied to the next key frame h to generate $$\frac{1}{2}(h - \tilde{h}).$$

These two items are added (1090) to the reconstructed non-key frame f̃ to generate the edge enhanced non-key frame.

In FIG. 10A, the weights for the edge maps are $$\frac{1}{2}$$

as an example. The weights for the edge maps can be defined in other ways. For example, the weight can be inversely proportional to the temporal distance between the target non-key frame and the source key frame. For example, if key frame g is the (N−1)-th frame, non-key frame f is the (N)-th frame and key frame h is the (N+1)-th frame, the temporal distance between g and f is 1, the temporal distance between f and h is 1, and the weights can be ½ each. If, on the other hand, key frame g is the (N−1)-th frame, non-key frame f is the (N)-th frame and key frame h is the (N+2)-th frame, then the temporal distance between g and f is 1, the temporal distance between f and h is 2, and the weights of blocks (1040) and (1080) can be ⅔ and ⅓, respectively. The weighting parameters can be also fixed or adaptive parameters. In addition, the weighting parameters can be defined depending on the differences between the current non-key frame and reference key frames.

Figure 10B:
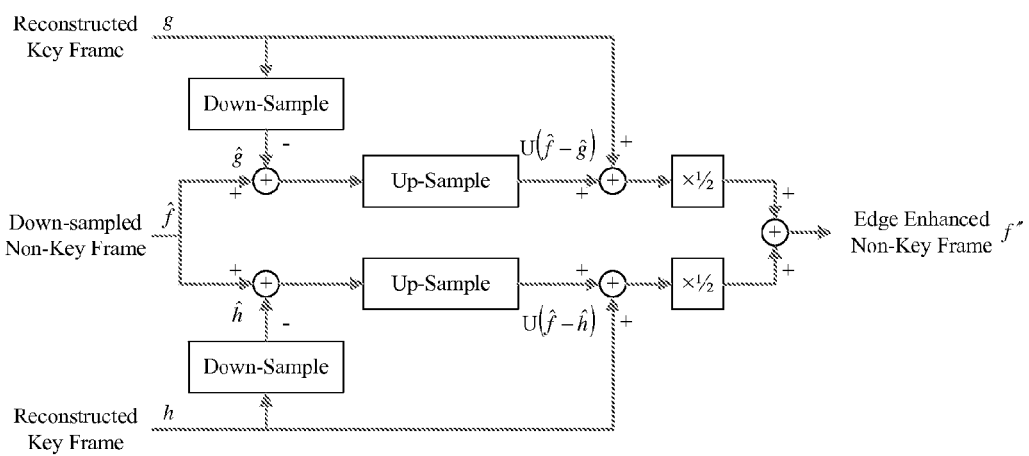
Figure 10C:
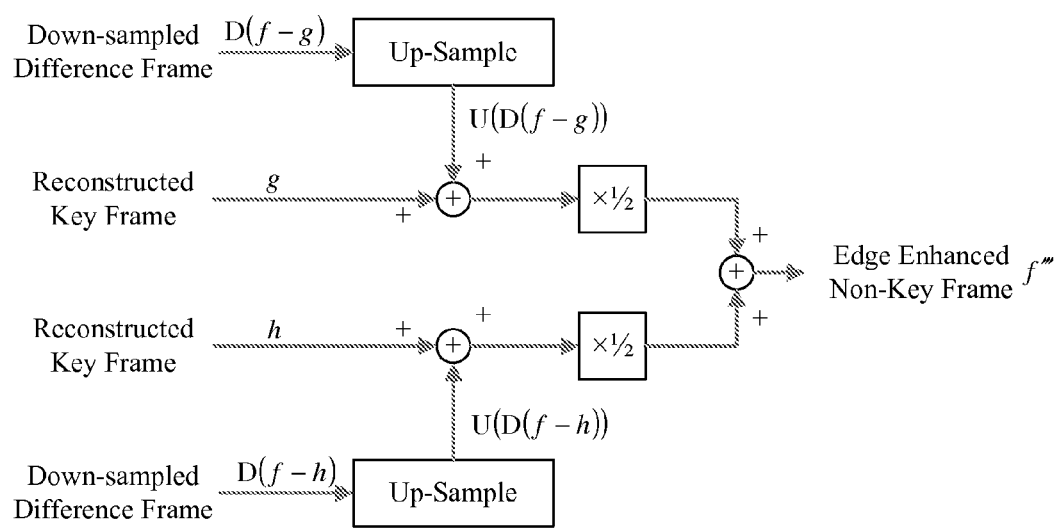

Similar extensions based on the approaches shown in equations (5) and (6) (see FIGS. 8 and 9) can be also applied to the bi-directional temporal edge enhancement, as shown in FIGS. 10B and 10C, in accordance with the following equations (7b) and (7c):

$$f'' = \frac{1}{2}[g + U(\hat{f} - \hat{g})] + \frac{1}{2}[h + U(\hat{f} - \hat{h})] \quad (7b)$$

$$f'' = \frac{1}{2}[g + U(D(f - g))] + \frac{1}{2}[h + U(D(f - h))] \quad (7c)$$

Figure 11:
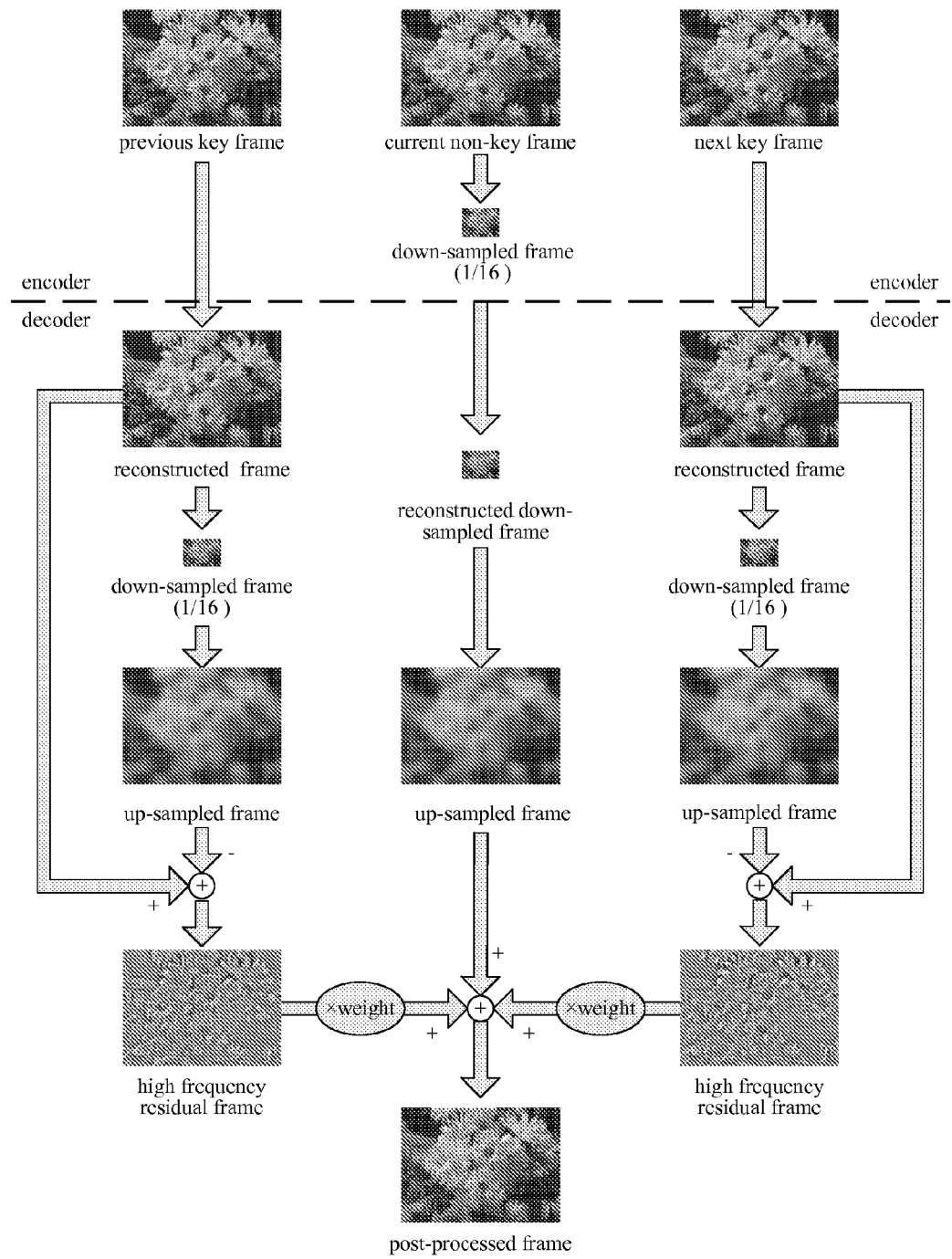
FIG. 11 shows an example of bi-directional temporal edge compensation for Type-I Assisted Frame metadata.

FIG. 11 shows an example of bi-directional temporal edge compensation for Type-I Assisted Frame metadata (see encoding/decoding process shown in FIG. 2). A downsampled version is used as metadata of the current frame, where the downsampling ratio is, for example, 4×4. In other words, the size of the down-sampled picture is 1/16 of the original frame. The previous and next key frames are encoded and decoded using H.264/AVC, thus corresponding to reconstructed key frames g and h of FIG. 10A. The current frame is the non-key frame and the metadata is the down-sampled frame f̂. The reconstructed non-key frame obtained by upsampling the metadata corresponds to f̃ in FIG. 10A. The metadata is also encoded and decoded using H.264/AVC. The reconstructed key frames are downsampled and upsampled to generate the high frequency edge information. Bi-directional edge compensation as shown in equations (7A)-(7C) above is applied to the upsampled non-key frame to improve the edge information of the metadata.

The bidirectional edge compensation can be further extended to multiple-frame temporal edge compensations that use K key frames (K≥2). A weighted sum of the edge maps from these K key frames can be used to improve the edge of the non-key frame. Typically, the key frames will be close to the non-key frame in order to have similar edges. In another embodiment, L (L≤K) key frames can be adaptively chosen from the K key frames to achieve the goal. The adaptive selection can be made either before downsampling/upsampling the reconstructed L key frames or after having upsampled the K reconstructed key frames. Adaptive selection can occur by comparing the K key frames with the current non-key frame and choose the L closest key frames. In other words, a metric is set up to determine the similarity of the frames and choose the L key frames that can have similar edges to the current frame. Furthermore, the K frames can include both key frames and previously post-processed non-key frames.

Both the upsampling and the post processing aim to recover the original information based on the downsampled information. This can be represented as the following optimization problem, $$f_{opt} = \underset{f'}{\operatorname{argmin}} |f' - f|. \quad (8)$$

The post processing embodiments in the previous sections of the present disclosure (see FIGS. 6, 8, 9 and 10) can be considered as unconstrained optimizations since the derived lost edge maps from the key frames are applied to the upsampled non-key frames without considering how close the resulting frame is to the unprocessed frame. This may lead to over processing in areas that should be preserved. Ideally, the post processed frame should still be considered as an upsampled version of f̂. In other words, if the post-processed non-key frame is downsampled using the same downsampling filter, it should still produce a downsampled image very close to f̂. In this constrained temporal edge compensation case, the optimization problem can be formulated as $$f_{opt} = \underset{f' \in F}{\mathrm{argmin}} |f' - f|, \text{ where } F = \{f' : |D(f') - \hat{f}| < T\} \quad (9)$$

where T is the tolerance threshold.

Such constraints can be applied to all the reconstruction schemes proposed in the present disclosure. By way of example, the post-processing scheme of equation (4) will be used to illustrate such constrained post processing.

To facilitate the discussion of additional rounds of processing, the original downsampled version can be defined as $\hat{f}_{(0)}$. The upsampled version at the decoder is denoted as $\tilde{f}_{(0)}$. The first round reconstruction as in equation (4) is $f_{(1)}=g+(\tilde{f}_{(0)}-\tilde{g})$. This reconstruction is downsampled to $\hat{f}_{(1)}$ using, for example, the same downsampling filter as the one used to generate $\hat{f}_{(0)}$. Similarly, the k-th round reconstruction is $f_{(k)}$ and its downsampled version is $\hat{f}_{(k)}$. The problem can be formulated as:

$$\text{minimize } |f_{(k)} - f|, \text{ subject to } |\hat{f}_{(k)} - \hat{f}_{(0)}| < T, \quad (10)$$

Since the original source f is unknown at the decoder, the optimization can be solved by approximation. Three constrained optimizations will be shown in the embodiments below.

Figure 12:
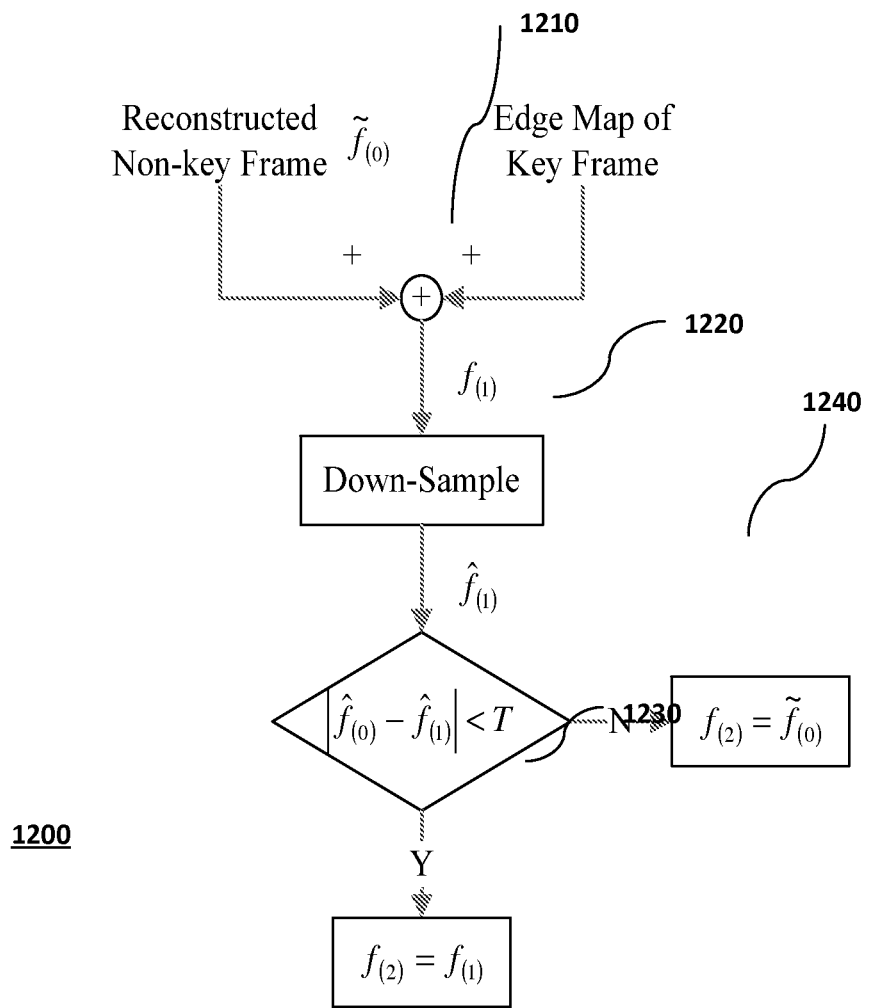
FIG. 12 shows a flow chart for computing constrained temporal edge compensation with threshold.

The first method for constrained optimization updates the post processed result based on the pixel difference between $\hat{f}_{(0)}$ and $\hat{f}_{(1)}$ as shown in FIG. 12. A first adder (1210) adds the reconstructed non-key frame $\tilde{f}_{(0)}$ and the edge map to obtain the first round reconstruction $f_{(1)}$.

The first round reconstruction is downsampled (1220) to $\hat{f}_{(1)}$ using the same filter that generates $\hat{f}_{(0)}$. If the pixel difference at the corresponding position of the downsampled version is less than the threshold T, the edge compensation is accepted (1230) $f_{(2)}=f_{(1)}$. Otherwise, edge enhancement is considered as a drift and the original upsampled frame is restored (1240) as the reconstruction $f_{(2)}=\tilde{f}_{(0)}$.

The scale factor can be denoted as α×α. The scale factor is defined as the ratio between the size of the original key frame and the size of the metadata. By way of example, if the original key frame has a (352×288) common intermediate video format (CIF), and the non-key frame is downsampled to a (176×144) quarter CIF (QCIF) video format to generate the metadata, the scale factor is 2×2. The decision of the edge compensation at position (i, j) of $f_{(2)}$ is based on the pixel difference at the position $$\left(\left\lfloor \frac{i}{\alpha} \right\rfloor, \left\lfloor \frac{j}{\alpha} \right\rfloor\right)$$

between $\hat{f}_{(0)}$ and $\hat{f}_{(1)}$. Here $\lfloor x \rfloor$ represents the floor operation of x, $\lfloor x \rfloor = \max\{n \in Z | n \leq x\}$ and Z is the set of integers. The update discussed with reference to FIG. 12 can be formulated as $$f_{(2)} = \begin{cases} f_{(1)} & |\hat{f}_{(0)} - \hat{f}_{(1)}| < T \\ \tilde{f}_{(0)} & |\hat{f}_{(0)} - \hat{f}_{(1)}| \geq T. \end{cases} \quad (11)$$

Additional iterations of successive refinement can be used to further improve the quality until it converges. For example, in the following equation (12), a fixed number or a monotonically decreasing series $T_k$ is used as the threshold. The iterative algorithm takes advantage of the edge information as well as the constraint of the downsampled frame.

$$f_{(k)} = \begin{cases} f_{(k-1)} & |\hat{f}_{(k-2)} - \hat{f}_{(k-1)}| < T_k \\ \tilde{f}_{(0)} & |\hat{f}_{(k-2)} - \hat{f}_{(k-1)}| \geq T_k, \end{cases} k \leq 2 \quad (12)$$

The algorithm stops until all the downsampled pixel differences in the frame are less than the threshold $T_k$. In practice, to keep a low post processing complexity at the decoder, one or two rounds of refinement, which are sufficient in most cases, can be used.

Figure 13:
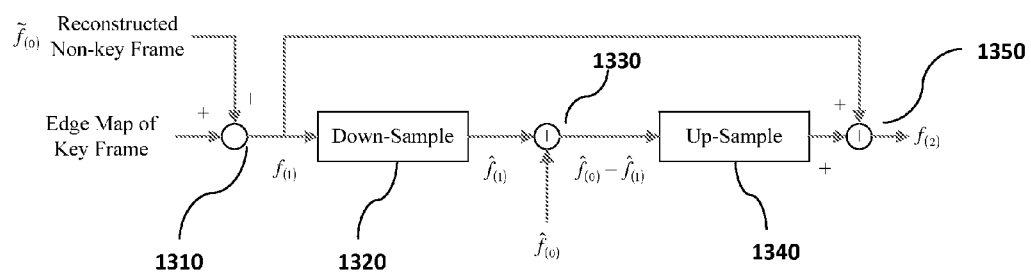
FIG. 13 shows a flow chart for computing constrained temporal edge compensation with correction.

The second method for constrained optimization adds the upsampled difference $(\hat{f}_{(0)}-\hat{f}_{(1)})$ as a correction term to the reconstruction as $f_{(1)}$ shown in FIG. 13. A first adder (1310) adds the reconstructed non-key frame $\tilde{f}_{(0)}$ and the edge map to obtain the first round reconstruction $f_{(1)}$, which is downsampled (1320) to $\hat{f}_{(1)}$ using the same filter that generates $\hat{f}_{(0)}$, similarly to what already discussed in FIG. 12. However, in this case a second adder (1330) provides a difference subsampled frame $\hat{f}_{(0)}-\hat{f}_{(1)}$ that is then upsampled (1340) to generate $U(\hat{f}_{(0)}-\hat{f}_{(1)})$. Finally $U(\hat{f}_{(0)}-\hat{f}_{(1)})$ is added (1350) to $f_{(1)}$ such that $f_{(2)}$ is obtained. In this way, the drifted edge enhancement is reduced, $$f_{(2)} = f_{(1)} + U(\hat{f}_{(0)} - \hat{f}_{(1)}) \quad (13).$$

This approach can be extended to a successive refinement iterative version. In the following equation (14), a step size $\Delta_k$ is multiplied with the difference frame $(\hat{f}_{(0)}-\hat{f}_{(k)})$ to control the speed of convergence. For example, $\Delta_k$ can be a monotonically decreasing series $$\left(\frac{\Delta}{k} \text{ or } \frac{\Delta}{2^k}\right),$$

where Δ is a fixed step size.

$$f_{(k+1)} = f_{(k)} + \Delta_{(k)} U(\hat{f}_{(0)} - \hat{f}_{(k)}), k \geq 2 \quad (14)$$

A third way to prevent over processing is to apply temporal edge compensation conditionally. A decision is made to determine whether temporal edge compensation should be applied. In the areas where the current key frame is highly correlated to the reference non-key frame, temporal edge compensation is applied. Otherwise, temporal edge compensation is disabled. One embodiment can be formulated as $$f' = \begin{cases} \tilde{f} + (g - \tilde{g}) & |\tilde{f} - \tilde{g}| < T \\ \tilde{f} & |\tilde{f} - \tilde{g}| \geq T. \end{cases} \quad (15)$$

Figure 14:
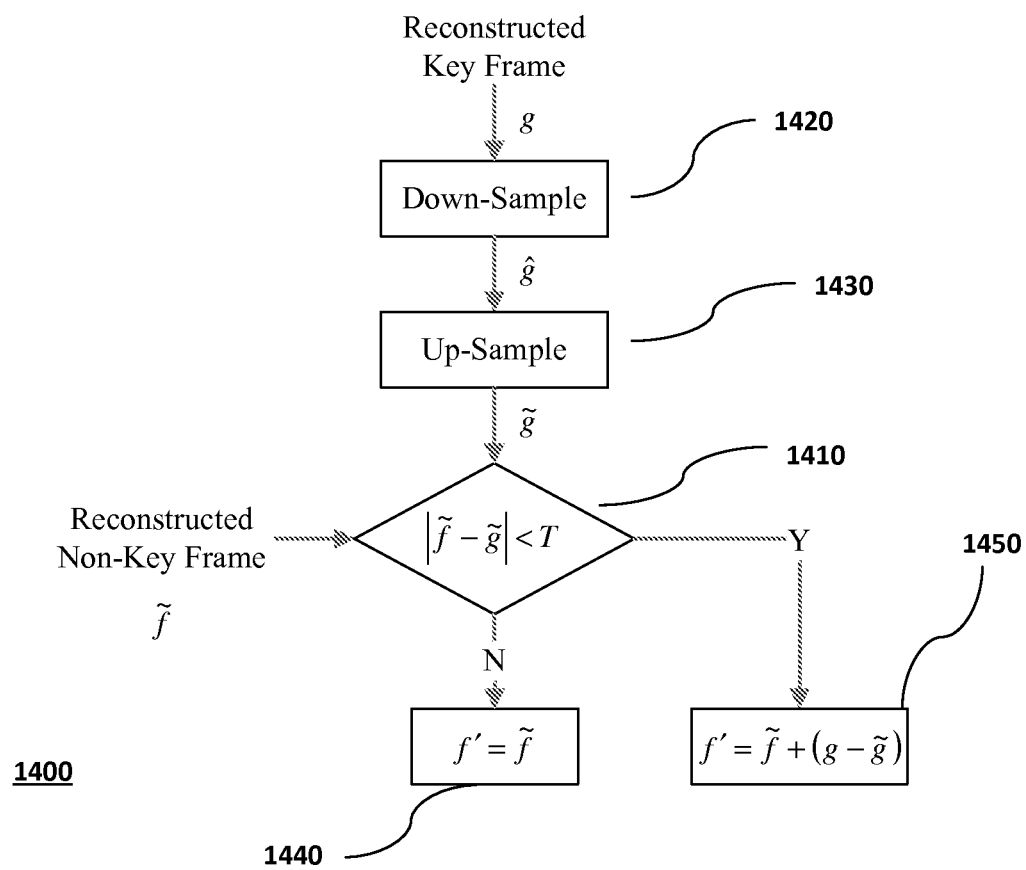
FIG. 14 shows a flow chart for computing each pixel using conditional temporal edge compensation with one reference key frame.

As shown in FIG. 14, the decision (1410) whether to apply or not to apply temporal edge compensation is made based on the difference at the pixel level. The neighboring key frame g is downsampled (1420) to ĝ. The downsampled frame ĝ is upsampled (1430) to the original size as g and denoted as g̃. The decision block (1410) computes the absolute distance between f̃ and g̃. If |f̃−g̃| is greater than or equal to the threshold T, temporal edge compensation is disabled (1440) and f'=f̃. If |f̃−g̃| is less than the threshold T, temporal edge compensation is applied (1450) and f'=f̃+(g−g̃).

Another embodiment of conditional temporal edge compensation can be applied to the case where two reference non-key frames are available and formulated as $$f' = \begin{cases} \tilde{f} + \dfrac{(g - \tilde{g} + h - \tilde{h})}{2} & |\tilde{f} - \tilde{g}| < T, |\tilde{f} - \tilde{h}| < T \\ \tilde{f} + (g - \tilde{g}) & |\tilde{f} - \tilde{g}| < T, |\tilde{f} - \tilde{h}| \geq T \\ \tilde{f} + (h - \tilde{h}) & |\tilde{f} - \tilde{g}| \geq T, |\tilde{f} - \tilde{h}| < T \\ \tilde{f} & |f - \hat{g}| \geq T, |f - \hat{h}| \geq T. \end{cases} \quad (16)$$

Figure 15:
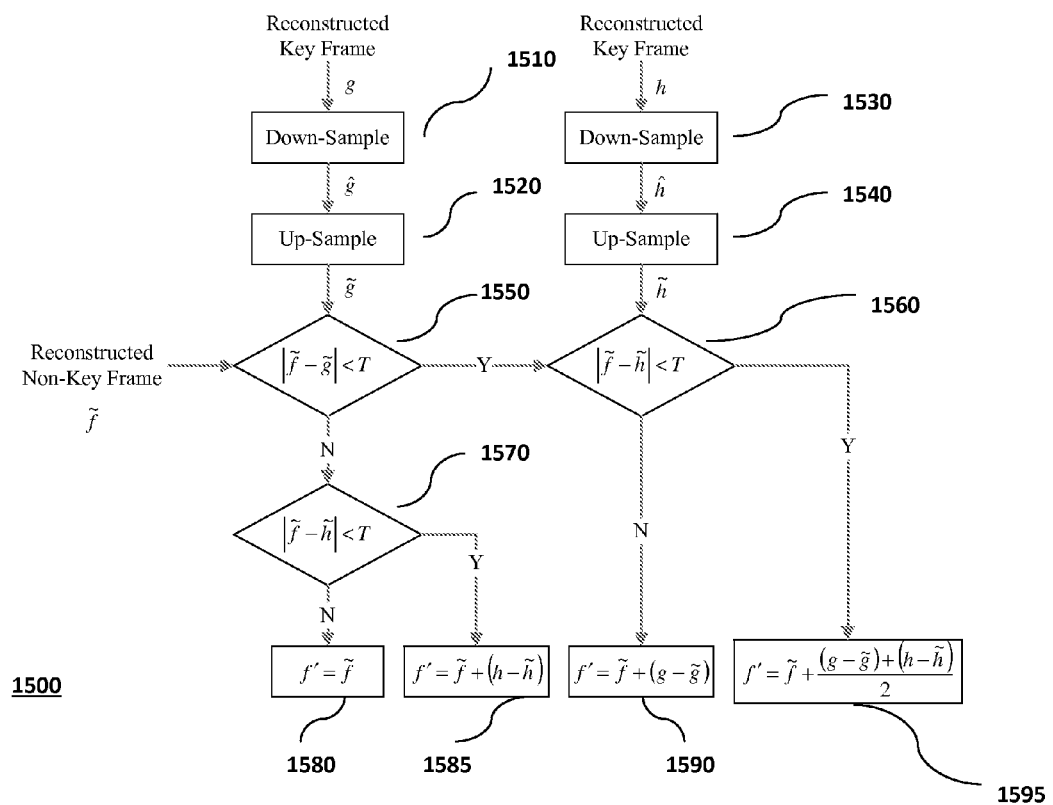
FIG. 15 shows a flow chart for computing each pixel using bi-directional conditional temporal edge compensation.

The flow chart for computing bi-directional conditional temporal edge compensation is shown in FIG. 15. The previous key frame g is downsampled (1510) to ĝ. The downsampled frame ĝ is upsampled (1520) to the original size as g and denoted as g̃. The next key frame h is downsampled (1530) to ĥ. The downsampled frame ĥ is upsampled (1540) to the original size and denoted as h̃. The decision (1550, 1560, 1570) is made based on two conditions and |f̃−g̃| and |f̃−h̃|.

If both |f̃−g̃| and |f̃−h̃| are greater than or equal to the threshold T, temporal edge compensation is disabled (1580) and f′=f̃. If |f̃−g̃| is greater than or equal to the threshold and |f̃−h̃| is smaller than the threshold, the temporal edge information from the key frame h is used in the compensation (1585) f′=f̃+(h−h̃). If |f̃−g̃| is smaller than the threshold and |f̃−h̃| is greater than or equal to the threshold, the temporal edge information from the key frame g̃ is used in the compensation (1590) f′=f̃+(g−g̃). If both |f̃−g̃| and |f̃−h̃| are smaller than the threshold, bi-directional temporal edge compensation is applied (1595)

$$f' = \tilde{f} + \dfrac{(g - \tilde{g}) + (h - \tilde{h})}{2}.$$

Figure 16:
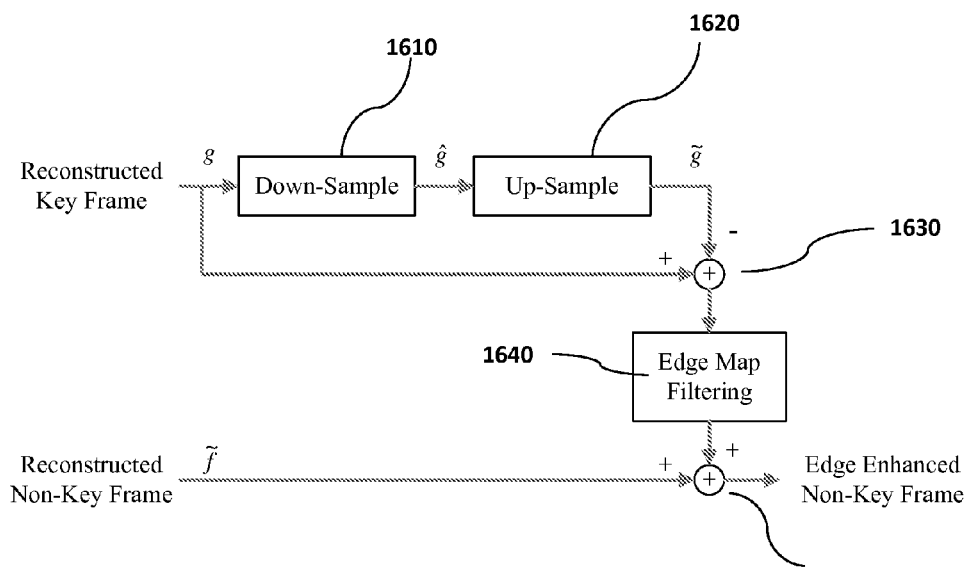
FIG. 16 shows a flow chart for computing temporal edge compensation with edge map filtering.
Figure 17:
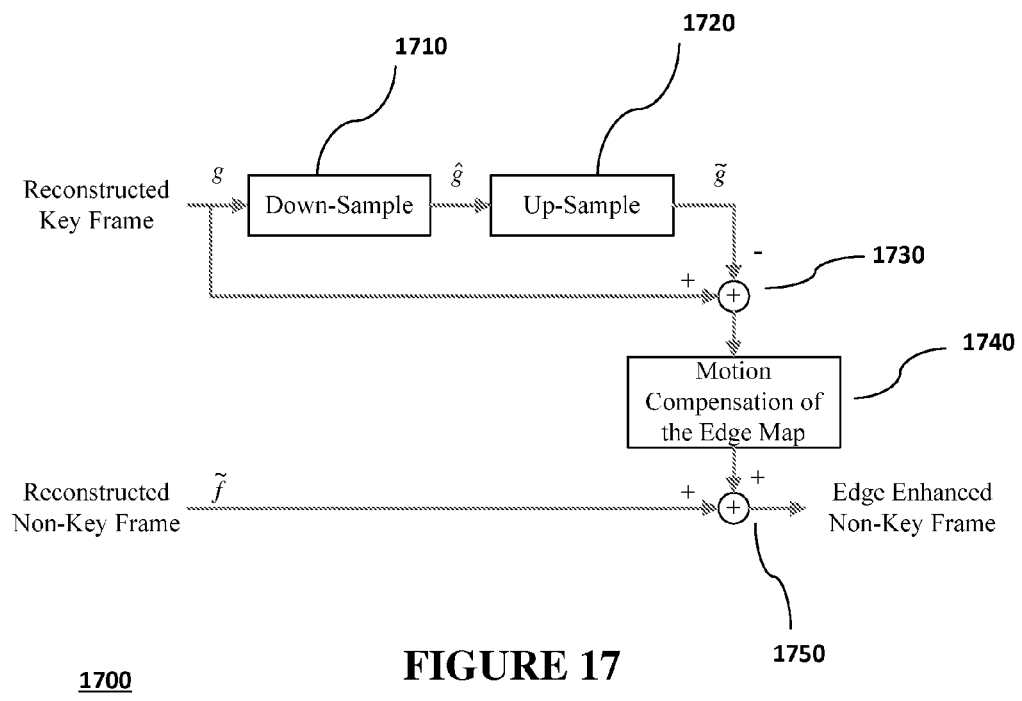
FIG. 17 shows a flow chart for computing temporal edge compensation with motion compensated edge map.

Further additional embodiments that can be applied to the present disclosure will be discussed in the next paragraphs with reference to FIGS. 16 and 17.

The derived edge map from the key frames contains various sources of noises and artifacts, such as the compression artifacts (for example, ringing/contouring/blocking artifacts). Edge map filtering can be used to remove or reduce the noise, which could improve the quality of the proposed post-processing methods. The filters can be low pass filters, Kalman filters, deblocking filters, deconvolution filters, Bayesian filters, bilateral filters and others. The flow chart is shown in FIG. 16 using the temporal edge embodiment of FIG. 6 as an example. The reconstructed key frame g is downsampled (1610) to generate the downsampled frame ĝ. It is then upsampled (1620) to the original size and denoted as g̃. The first adder (1630) generates the edge map g−g̃. The edge map is passed through the edge map filtering (1640) to generate a filtered edge map. The second adder (1650) compensates f̃ using the filtered edge map and generates the edge enhanced non-key frame.

Further improvements can be achieved by considering motions in the lost edge map. Motion compensation can be applied on the edge information of the key frame g−g̃ to generate a prediction of the edge information for the non-key frame. As shown in FIG. 17 (where reference is made again, by way of example, to the embodiment of FIG. 6), the reconstructed key frame g is downsampled (1710) to generate the downsampled frame ĝ. It is then upsampled (1720) to g̃. The first adder (1730) generates the edge map g−g̃. The edge map is processed (1740) to generate a motion compensated edge map. The motion vectors of the edge map can be derived in a similar way as for motion compensated temporal interpolation. The second adder (1750) adds f̃ using the motion compensated edge map and generates the edge enhanced non-key frame. By way of example, with reference to the embodiment of FIG. 8, the filtering/motion compensation can be applied between the first adder and the upsampler (820) or between the upsampler (820) and the second adder (840). With reference to the embodiment of FIG. 9, the filtering/motion compensation can be applied either before or after the upsampler (920). With reference to the embodiment of FIG. 10, the filtering/motion compensation can be applied either before or after the multipliers (1040), (1080).

FIG. 7, already described above, has shown some examples with subject comparisons. FIG. 18 shows objective quality comparisons with and without temporal edge enhancement using PSNR (peak signal-to-noise ratio). In this example, Type-I Assisted Frame metadata has been used and the downsample ratio is 4×4. Both the key and non-key frames are encoded and decoded using H.264/AVC. The process follows the diagram of FIG. 11. Both the uni-directional temporal edge compensation as specified in equation (4) and the bi-directional temporal edge compensation as specified in equation (7) are compared to the case f̃ without post-processing.

Regarding compression efficiency of the metadata-based techniques, the bit rates of the metadata depend on the coding structure and characteristics of the source sequences. Generally the bit rate of the metadata is approximately proportional to the resolution of the metadata. For example, the number of frames in the compressed stream is equal to the number of frames represented by metadata. The metadata is encoded in the same coding structure as the compressed stream. The compressed stream encodes the source frames in full resolution and the metadata encodes the source frames in sub-sampled resolution. If the metadata is represented by a downsampling ratio of 2×2, the metadata would add around 25% bit rate of the compressed stream. If the metadata is represented by a downsampling ratio of 4×4, the metadata would add around 6.25% bit rate of the compressed stream. The percentage can be further reduced if more B frames are used in encoding the metadata. The edge enhancement methods according to the present disclosure can improve the visual quality without sending any additional metadata. A set of examples have been shown in FIG. 7 with a downsampling ratio 4×4. It will be appreciated by those skilled in the art that the overhead in data is acceptable given the improvement in image quality, particularly considering the low complexity required for the decoder and post-processor to obtain the resulting advantages.

The present disclosure is also directed to embodiments that are not limited to key frame/non-key frame differentiation. For example, the embodiments shown in the description and figures of the present application are also applicable to cases where a current frame loses its high frequency components or edges in the processing chain, and it is then enhanced with the corresponding components in the neighboring frames, assuming that the neighboring frames have sufficient high frequency components or edges available.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

The examples set forth above are provided to give those of ordinary skill in the art a complete disclosure and description of how to make and use the embodiments of the edge enhancement for temporal scaling with metadata of the disclosure, and are not intended to limit the scope of what the inventors regard as their disclosure. Modifications of the above-described modes for carrying out the disclosure may be used by persons of skill in the video art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

Accordingly the invention may suitably comprise, consist of, or consist essentially of, any of element (the various parts or features of the invention and their equivalents as described herein, currently existing, and/or as subsequently developed. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

Accordingly, the invention may be embodied in any of the forms described herein, including, but not limited to the following Enumerated Example Embodiments (EEEs) which described structure, features, and functionality of some portions of the present invention:

EEE1. A method to post-process a non-key frame of an image through a neighboring key frame of the image, comprising:
    downsampling a reconstructed key frame to form a downsampled reconstructed key frame;
    upsampling the downsampled reconstructed key frame to form an upsampled reconstructed key frame;
    forming a difference between the reconstructed key frame and the upsampled reconstructed key frame; and
    adding the difference to a reconstructed non-key frame to compensate the reconstructed non-key frame.

EEE2. The method of claim 1, wherein the difference between the reconstructed key frame and the upsampled reconstructed key frame is filtered before being added to the reconstructed non-key frame.

EEE3. The method of claim 1, wherein the difference between the reconstructed key frame and the upsampled reconstructed key frame is motion compensated before being added to the reconstructed non-key frame.

EEE4. A method to process a non-key frame of an image through a key frame of the image, comprising:
    downsampling a reconstructed key frame to form a downsampled reconstructed key frame;
    forming a difference between the downsampled non-key frame and a downsampled reconstructed key frame;
    upsampling the difference to form an upsampled difference; and
    adding the upsampled difference to the reconstructed key frame.

EEE5. The method of claim 4, wherein the key frame is a neighboring key frame of the non-key frame.

EEE6. The method of claim 4, wherein the steps of forming the difference, upsampling and adding occur at a decoding stage of the image.

EEE7. A method to process a non-key frame of an image through a neighboring key frame of the image, comprising:
    forming a difference between the non-key frame and the key frame;
    downsampling the difference to form a downsampled difference;
    upsampling the downsampled difference to form an upsampled difference;
    reconstructing the key frame; and
    adding the upsampled difference to the reconstructed key frame.

EEE8. The method of claim 7, wherein the key frame is a neighboring key frame of the non-key frame.

EEE9. The method of claim 7, wherein the steps of upsampling and adding occur at a decoding stage of the image.

EEE10. A method to post-process a non-key frame of an image through key frames of the image, comprising:
    downsampling a plurality of reconstructed key frames to form downsampled reconstructed key frames;
    upsampling the downsampled reconstructed key frames to form upsampled reconstructed key frames;
    forming differences between the reconstructed key frames and the respective upsampled reconstructed key frames; and
    adding a sum of the differences to a reconstructed non-key frame to compensate the reconstructed non-key frame.

EEE11. The method of claim 10, wherein the key frames comprise one or more key frames previous to the non-key frame and/or one or more key frames following the non-key frame.

EEE12. The method of claim 10, wherein the differences are weighted differences based on weighting parameters.

EEE13. The method of claim 12 wherein the weighting parameters depend on a temporal distance between the key frame of each difference and the non-key frame.

EEE14. The method of claim 12, wherein the weighting parameters are fixed parameters.

EEE15. The method of claim 12, wherein the weighting parameters depend on a difference between a current non-key frame and reference key frames.

EEE16. The method of claim 12, wherein the weighting parameters are adaptive.

EEE17. The method of claim 10, wherein the adding the sum of the differences is limited to a sum of the differences formed with reference to an adaptively chosen subset of the key frames.

EEE18. The method of claim 10, wherein the reconstructed non-key frame is further compensated by taking into account previously post-processed non-key frames.

EEE19. A method to post-process a non-key frame of an image through key frames of the image, comprising:
downsampling reconstructed key frames to form downsampled reconstructed key frames;
for each downsampled reconstructed key frame forming a difference between a downsampled non-key frame and the downsampled reconstructed key frame;
upsampling each difference to form upsampled differences;
adding each reconstructed key frame to a respective upsampled difference to form revised upsampled differences; and
adding the revised upsampled differences together to form a compensated non-key frame.

EEE20. The method of claim 19, wherein the revised upsampled differences are weighted revised upsampled differences based on weighting parameters.

EEE21. The method of claim 20 wherein the weighting parameters depend on a temporal distance between the key frame of each difference and the non-key frame.

EEE22. The method of claim 20, wherein the weighting parameters are fixed parameters.

EEE23. The method of claim 20, wherein the weighting parameters depend on a difference between a current non-key frame and reference key frames.

EEE24. The method of claim 20, wherein the weighting parameters are adaptive.

EEE25. A method to post-process a non-key frame of an image through key frames of the image, comprising:
providing reconstructed key frames;
upsampling downsampled differences between each reconstructed key frame and a non-key frame to form upsampled differences;
adding each upsampled difference to a respective reconstructed key frame to form revised upsampled differences; and
adding the revised upsampled differences together to form a compensated non-key frame.

EEE26. The method of claim 25, wherein the revised upsampled differences are weighted revised upsampled differences based on weighting parameters.

EEE27. The method of claim 26 wherein the weighting parameters depend on a temporal distance between the key frame of each difference and the non-key frame.

EEE28. The method of claim 26, wherein the weighting parameters are fixed parameters.

EEE29. The method of claim 26, wherein the weighting parameters depend on a difference between a current non-key frame and reference key frames.

EEE30. The method of claim 26, wherein the weighting parameters are adaptive.

EEE31. A method to evaluate whether to update or not update a non-key frame portion of an image during decoding of the image, comprising:
providing a first non-key frame portion;
providing a difference key frame portion between a key frame portion and an upsampled version of the key frame portion;
adding the difference key frame portion to the first non-key frame portion to form a second non-key frame portion;
downsampling the second non-key frame portion;
evaluating if a difference portion between the downsampled second non-key frame portion and a downsampled first non-key frame portion is less than a threshold value;
if the difference portion is less than the threshold value updating the non-key frame portion to the second non-key frame portion; and
if the difference portion is not less than the threshold value, keeping the first non-key frame portion.

EEE32. The method of claim 31, wherein the key frame is a neighboring frame of the non-key frame.

EEE33. The method of claim 31 or 32, wherein the key frame portion is a pixel of the key frame and the non-key frame portion is a pixel of the non-key frame.

EEE34. The method of any one of claims 31-33, wherein the evaluating step is performed iteratively with decreasing threshold values.

EEE35. A method to update a non-key frame portion of an image during decoding of the image, comprising:
providing a first non-key frame portion;
providing a difference key frame portion between a key frame portion and an upsampled version of the key frame portion;
adding the difference key frame portion to the first non-key frame portion to form a second non-key frame portion;
downsampling the second non-key frame portion;
forming a difference between a downsampled first non-key frame portion and the downsampled second non-key frame portion;
upsampling the difference; and
adding the upsampled difference to the second non-key frame portion to form an updated non-key frame portion.

EEE36. The method of claim 35, wherein the key frame is a neighboring frame of the non-key frame.

EEE37. The method of claim 35 or 36, wherein the key frame portion is a pixel of the key frame and the non-key frame portion is a pixel of the non-key frame.

EEE38. A method to evaluate whether to apply temporal edge compensation to a non-key frame portion of an image during a decoding process of the image, comprising:
providing a key frame portion of the image;
downsampling the key frame portion to form a downsampled key frame portion;
upsampling the downsampled key frame portion to form an upsampled key frame portion;
evaluating whether a difference between the up sampled key frame portion and an uncompensated non-key frame portion is less than a threshold;
if the difference is less than the threshold, compensating the non-key frame portion by adding to the non-key frame portion a difference between the key frame portion and the upsampled key frame portion; and
if the difference is not less than the threshold, keeping the non-key frame portion uncompensated.

EEE39. The method of claim 38, wherein the key frame is a neighboring frame of the non-key frame.

EEE40. The method of claim 38 or 39, wherein the key frame portion is a pixel of the key frame and the non-key frame portion is a pixel of the non-key frame.

EEE41. The method of any one of claims 38-40, wherein the evaluating step is performed iteratively with decreasing threshold values.

EEE42. A method to evaluate whether to apply temporal edge compensation to a non-key frame of an image during a decoding process of the image, comprising:
providing first and a second key frame portions of the image;
downsampling the first and the second key frame portions of the image to form downsampled first and second key frame portions;
upsampling the downsampled first and second key frame portions to form upsampled first and second key frame portions;

evaluating whether a first difference between the upsampled first key frame portion and an uncompensated non-key frame portion is less than a threshold;

evaluating whether a second difference between the upsampled second key frame portion and the uncompensated non-key frame portion is less than the threshold;

if the first difference and the second difference are less than the threshold, compensating the non-key frame portion by adding to the non-key frame portion a sum of a difference between the first key frame portion and the upsampled first key frame portion and a difference between the second key frame portion and the upsampled second key frame portion;

if the first difference is less than the threshold and second difference is not less than the threshold, compensating the non-key frame portion by adding to the non-key frame portion the difference between the first key frame portion and the upsampled first key frame portion;

if the first difference is not less than the threshold and second difference is less than the threshold, compensating the non-key frame portion by adding to the non-key frame portion the difference between the second key frame portion and the upsampled second key frame portion; and if the first difference and the second difference are not less than the threshold, keeping the non-key frame portion uncompensated.

EEE43. The method of claim 42, wherein the first and the second key frames are neighboring frames of the non-key frame.

EEE44. The method of claim 42 or 43, wherein the key frame portion is a pixel of the key frame and the non-key frame portion is a pixel of the non-key frame.

EEE45. The method of any one of claims 42-44, wherein the evaluating steps are performed iteratively with decreasing threshold values.

EEE46. A method to evaluate whether to update or not update non-key frame portions of an image during decoding of the image, comprising:

providing a first non-key frame portion;

providing a plurality of difference key frame portions between each key frame portion and upsampled versions of the key frame portions;

adding each difference key frame portion to a respective non-key frame portion to form a plurality of second non-key frame portions;

downsampling each second non-key frame portion;

evaluating if one or more difference portions between each downsampled second non-key frame portion and a downsampled first non-key frame portion are less than a threshold value;

if one or more difference portions are less than the threshold value updating the non-key frame portion, otherwise keeping the first non-key frame portion.

EEE47. A method to update a non-key frame portion of an image during decoding of the image, comprising:

providing a first non-key frame portion;

providing a plurality of difference key frame portions between key frame portions and respective upsampled versions of the key frame portions;

adding the difference key frame portions to the first non-key frame portion to form a second non-key frame portion;

downsampling the second non-key frame portion;

forming a difference between a downsampled first non-key frame portion and the downsampled second non-key frame portion;

upsampling the difference; and adding the upsampled difference to the second non-key frame portion to form an updated non-key frame portion.

EEE48. The method of claim 47, wherein the adding of the difference key frame portions is a weighted adding.

EEE49. A method to enhance a reconstructed frame of an image through a neighboring frame of the image, comprising:

downsampling a reconstructed neighboring frame of the frame to be enhanced to form a downsampled reconstructed frame;

upsampling the downsampled reconstructed frame to form an upsampled reconstructed frame;

forming a difference between the reconstructed frame and the upsampled reconstructed frame; and adding the difference to the reconstructed frame to be enhanced.

EEE50. The method of claim 49, wherein adding the difference to the reconstructed frame to be enhanced enhances the reconstructed frame through addition of high frequency components to the reconstructed frame.

EEE51. A method to enhance a frame of an image through a neighboring frame of the image, comprising:

downsampling a reconstructed neighboring frame of the frame to be enhanced to form a downsampled reconstructed frame;

forming a difference between a downsampled frame to be enhanced and the downsampled reconstructed key frame;

upsampling the difference to form an upsampled difference; and adding the upsampled difference to the reconstructed neighboring frame.

EEE52. The method of claim 51, wherein adding the upsampled difference to the reconstructed neighboring frame enhances the frame of the image through addition of high frequency components to the frame of the image.

EEE53. A method to enhance a frame of an image through a neighboring frame of the image, comprising:

forming a difference between the frame to be enhanced and the neighboring frame;

downsampling the difference to form a downsampled difference;

upsampling the downsampled difference to form an upsampled difference;

reconstructing the neighboring frame; and adding the upsampled difference to the reconstructed neighboring frame. EEE54. The method of claim 53, wherein adding the upsampled difference to the reconstructed neighboring frame enhances the frame of the image through addition of high frequency components to the frame of the image.

EEE55. A method to enhance a frame of an image through neighboring frames of the image, comprising:

downsampling a plurality of reconstructed neighboring frames to form downsampled reconstructed neighboring frames;

upsampling the downsampled reconstructed neighboring frames to form upsampled reconstructed neighboring frames;

forming differences between the reconstructed neighboring frames and the respective upsampled reconstructed neighboring frames; and adding a sum of the differences to a reconstructed frame to enhance the reconstructed frame.

EEE56. The method of claim 55, wherein adding the sum of the differences to the reconstructed frame enhances the reconstructed frame through addition of high frequency components to the reconstructed frame.

EEE57. A method to enhance a frame of an image through neighboring frames of the image, comprising:

downsampling reconstructed neighboring frames to form downsampled reconstructed neighboring frames;

for each downsampled reconstructed neighboring frame forming a difference between a downsampled frame to be enhanced and the downsampled reconstructed neighboring frame;
upsampling each difference to form upsampled differences;
adding each reconstructed neighboring frame to a respective upsampled difference to form revised upsampled differences; and
adding the revised upsampled differences together to form an enhanced frame.

EEE58. The method of claim 57, wherein adding the revised upsampled differences enhances the frame through addition of high frequency components to the frame.

EEE59. A method to enhance a frame of an image through neighboring frames of the image, comprising:
providing reconstructed neighboring frames;
upsampling downsampled differences between each reconstructed neighboring frame and a frame to be enhanced to form upsampled differences;
adding each upsampled difference to a respective reconstructed neighboring frame to form revised upsampled differences; and
adding the revised upsampled differences together to form an enhanced frame.

EEE60. The method of claim 59, wherein adding the revised upsampled differences forms an enhanced frame through addition of high frequency components to the frame.

EEE61. A system for processing one or more frames of an image according to the method of any one of claims 1-60.

EEE62. Use of the method of any one of claims 1-60 to process one or more frames of an image.

EEE63. A computer-readable medium containing a set of instructions that causes a computer to perform the method recited in any one of claims 1-60.

The invention claimed is:

1. A method to post-process a non-key frame of a video sequence through a neighboring key frame of the video sequence, comprising:
downsampling a reconstructed key frame to form a downsampled reconstructed key frame;
upsampling the downsampled reconstructed key frame to form an upsampled reconstructed key frame;
forming a difference between the reconstructed key frame and the upsampled reconstructed key frame;
adding the difference to a reconstructed non-key frame to compensate the reconstructed non-key frame to form an edge enhanced non-key frame; and
updating the edge enhanced non-key frame to form an updated non-key frame based on a difference between a downsampled edge enhanced non-key frame and a downsampled non-key frame,
wherein the downsampled edge enhanced non-key frame is formed by downsampling the edge enhanced non-key frame and the reconstructed non-key frame is formed by upsampling the downsampled non-key frame.

2. The method of claim 1, wherein the difference between the reconstructed key frame and the upsampled reconstructed key frame is filtered before being added to the reconstructed non-key frame.

3. The method of claim 1, wherein the updating comprises:
evaluating if the difference between the downsampled edge enhanced non-key frame and the downsampled reconstructed non-key frame is less than a threshold value;
if the difference between the downsampled edge enhanced non-key frame and the downsampled non-key frame is less than the threshold value, setting the updated non-key frame to the edge enhanced non-key frame; and
if the difference between the downsampled edge enhanced non-key frame and the downsampled non-key frame is not less than the threshold value, setting the updated non-key frame to the reconstructed non-key frame.

4. The method of claim 1, wherein the updating comprises:
setting a first frame to the reconstructed non-key frame and a first downsampled frame to the downsampled non-key frame, wherein the first frame is formed by upsampling the first downsampled frame;
setting a second frame to the edge enhanced non-key frame and a second downsampled frame to the downsampled edge enhanced non-key frame, wherein the second downsampled frame is formed by downsampling the second frame;
evaluating if the difference between the first downsampled frame and the second downsampled frame is less than a threshold value;
if the difference between the first downsampled frame and the second downsampled frame is less than the threshold value, setting the updated non-key frame to the second frame;
if the difference between the first downsampled frame and the second downsampled frame is not less than the threshold value, setting the updated non-key frame to the reconstructed non-key frame;
updating the first frame to the second frame and the first downsampled frame to the second downsampled frame;
updating the second frame to the updated non-key frame and the second downsampled frame to a downsampled updated non-key frame, wherein the downsampled updated non-key frame is formed by downsampling the updated non-key frame; and
iterating the evaluating, the setting of the updated non-key frame, the updating of the first frame, and the updating of the second frame until one or more criteria are satisfied.

5. The method of claim 4, wherein the threshold value is monotonically decreasing between successive iterations.

6. The method of claim 4, wherein the iterating is performed a set number of times.

7. The method of claim 1, wherein the updating comprises:
upsampling the difference between the downsampled edge enhanced non-key frame and the downsampled non-key frame to form an upsampled difference; and
adding the upsampled difference and the edge enhanced non-key frame to form the updated non-key frame.

8. The method of claim 1, wherein the updating comprises:
setting a first frame to the edge enhanced non-key frame and a first downsampled frame to the downsampled edge enhanced non-key frame, wherein the first downsampled frame is formed by downsampling the first frame;
upsampling the difference between the downsampled first frame and the downsampled non-key frame to form an upsampled difference;
multiplying a step size with the upsampled difference to form a scaled upsampled difference;
adding the scaled upsampled difference to form the updated non-key frame;
setting the first frame to the updated non-key frame and the first downsampled frame to a downsampled updated non-key frame, wherein the downsampled updated non-key frame is formed by downsampling the updated non-key frame; and
iterating the upsampling of the difference, the multiplying, the adding, and the setting of the first frame.

9. The method of claim 8, wherein the step size is monotonically decreasing between successive iterations.

10. A method to process a non-key frame of a video sequence through a key frame of the video sequence, comprising:
- downsampling a reconstructed key frame to form a downsampled reconstructed key frame;
- forming a difference between a downsampled non-key frame and the downsampled reconstructed key frame;
- upsampling the difference to form an upsampled difference;
- adding the upsampled difference to the reconstructed key frame to form an edge enhanced non-key frame; and
- updating the edge enhanced non-key frame to form an updated non-key frame based on a difference between a downsampled edge enhanced non-key frame and the downsampled non-key frame,
- wherein the downsampled edge enhanced non-key frame is formed by downsampling the edge enhanced non-key frame.

11. The method of claim 10, wherein the key frame is a neighboring key frame of the non-key frame.

12. The method of claim 10, wherein the steps of forming the difference, upsampling and adding occur at a decoding stage of the video sequence.

13. A method to process a non-key frame of a video sequence through a neighboring key frame of the video sequence, comprising:
- forming a difference between the non-key frame and a reconstructed key frame;
- downsampling the difference to form a downsampled difference;
- upsampling the downsampled difference to form an upsampled difference;
- adding the upsampled difference to the reconstructed key frame to generate an edge enhanced non-key frame; and
- updating the edge enhanced non-key frame to form an updated non-key frame based on a difference between a downsampled edge enhanced non-key frame and a downsampled non-key frame,
- wherein the downsampled edge enhanced non-key frame is formed by downsampling the edge enhanced non-key frame and the downsampled non-key frame is formed by downsampling the non-key frame.

14. The method of claim 13, wherein the reconstructed key frame is a neighboring key frame of the non-key frame.

15. The method of claim 13, wherein the steps of upsampling and adding occur at a decoding stage of the video sequence.

16. A method to post-process a non-key frame of a video sequence through key frames of the video sequence, comprising:
- downsampling a plurality of reconstructed key frames to form downsampled reconstructed key frames;
- upsampling the downsampled reconstructed key frames to form upsampled reconstructed key frames;
- forming differences between the reconstructed key frames and the respective upsampled reconstructed key frames;
- adding a sum of the differences to a reconstructed non-key frame to compensate the reconstructed non-key frame to form an edge enhanced non-key frame; and
- updating the edge enhanced non-key frame to form an updated non-key frame based on a difference between a downsampled edge enhanced non-key frame and a downsampled non-key frame,
- wherein the downsampled edge enhanced non-key frame is formed by downsampling the edge enhanced non-key frame and the reconstructed non-key frame is formed by upsampling the downsampled non-key frame.

17. The method of claim 16, wherein the key frames comprise one or more key frames previous to the non-key frame and/or one or more key frames following the non-key frame.

18. The method of claim 16, wherein the differences are weighted differences based on weighting parameters.

19. The method of claim 18 wherein the weighting parameters depend on a temporal distance between the key frame of each difference and the non-key frame.

20. The method of claim 18, wherein the weighting parameters are fixed parameters.

21. The method of claim 18, wherein the weighting parameters depend on a difference between a current non-key frame and the plurality of reconstructed key frames.

22. The method of claim 18, wherein the weighting parameters are adaptive.

23. The method of claim 16, wherein the adding the sum of the differences is limited to a sum of the differences formed with reference to an adaptively chosen subset of the key frames.

24. The method of claim 16, wherein the reconstructed non-key frame is further compensated by taking into account previously post-processed non-key frames.

25. A method to post-process a non-key frame of a video sequence through key frames of the video sequence, comprising:
- downsampling reconstructed key frames to form downsampled reconstructed key frames;
- for each downsampled reconstructed key frame forming a difference between a downsampled non-key frame and the downsampled reconstructed key frame;
- upsampling each difference to form upsampled differences;
- adding each reconstructed key frame to a respective upsampled difference to form revised upsampled differences;
- adding the revised upsampled differences together to form an edge enhanced non-key frame; and
- updating the edge enhanced non-key frame to form an updated non-key frame based on a difference between a downsampled edge enhanced non-key frame and the downsampled non-key frame,
- wherein the downsampled edge enhanced non-key frame is formed by downsampling the edge enhanced non-key frame.

26. The method of claim 25, wherein the revised upsampled differences are weighted revised upsampled differences based on weighting parameters.

27. The method of claim 26 wherein the weighting parameters depend on a temporal distance between the key frame of each difference and the non-key frame.

28. The method of claim 26, wherein the weighting parameters are fixed parameters.

29. The method of claim 26, wherein the weighting parameters depend on a difference between a current non-key frame and reference key frames.

30. The method of claim 26, wherein the weighting parameters are adaptive.

* * * * *